(12) United States Patent
Gouldd et al.

(10) Patent No.: US 8,651,375 B1
(45) Date of Patent: Feb. 18, 2014

(54) GIFT CARD AND REFERRAL CARD SYSTEM AND METHOD

(76) Inventors: Bill Gouldd, Dallas, TX (US); Michael Varian, Dallas, TX (US)

( * ) Notice: Subject to any disclaimer, the term of this patent is extended or adjusted under 35 U.S.C. 154(b) by 0 days.

(21) Appl. No.: 13/088,147

(22) Filed: Apr. 15, 2011

Related U.S. Application Data

(63) Continuation-in-part of application No. 12/842,143, filed on Jul. 23, 2010, which is a continuation of application No. 12/778,805, filed on May 12, 2010, now abandoned.

(60) Provisional application No. 61/177,551, filed on May 12, 2009.

(51) Int. Cl.
*G06K 5/00* (2006.01)

(52) U.S. Cl.
USPC .......................... 235/380; 235/375; 235/487

(58) Field of Classification Search
USPC .................. 235/375, 380, 487; 705/14.16
See application file for complete search history.

(56) References Cited

U.S. PATENT DOCUMENTS

| | | | | |
|---|---|---|---|---|
| 7,255,267 | B2* | 8/2007 | Chao | 235/380 |
| 8,083,062 | B2* | 12/2011 | Norman | 206/454 |
| 2004/0215536 | A1* | 10/2004 | Deliwala et al. | 705/34 |
| 2005/0209917 | A1* | 9/2005 | Anderson et al. | 705/14 |
| 2006/0224454 | A1* | 10/2006 | Kantor et al. | 705/14 |
| 2009/0266724 | A1* | 10/2009 | Norman | 206/232 |
| 2009/0276305 | A1* | 11/2009 | Clopp | 705/14.16 |
| 2010/0223120 | A1* | 9/2010 | Dragt | 705/14.27 |
| 2010/0274647 | A1* | 10/2010 | Earle | 705/14.13 |
| 2010/0274650 | A1* | 10/2010 | Kantor et al. | 705/14.16 |
| 2012/0054000 | A1* | 3/2012 | Boppert et al. | 705/14.1 |

* cited by examiner

*Primary Examiner* — Daniel Hess
*Assistant Examiner* — Paultep Savusdiphol
(74) *Attorney, Agent, or Firm* — Theodore F. Shiells

(57) ABSTRACT

A system comprising a referral acceptor; a referral coordinator coupled to the referral acceptor; a referral calculator coupled to the referral calculator; and an input/output (I/O) device coupled to the referral coordinator. The referral acceptor is configured to accept a referral card. The referral card has a referrer identifier which identifiers a referrer of a holder of the referral card.

20 Claims, 14 Drawing Sheets

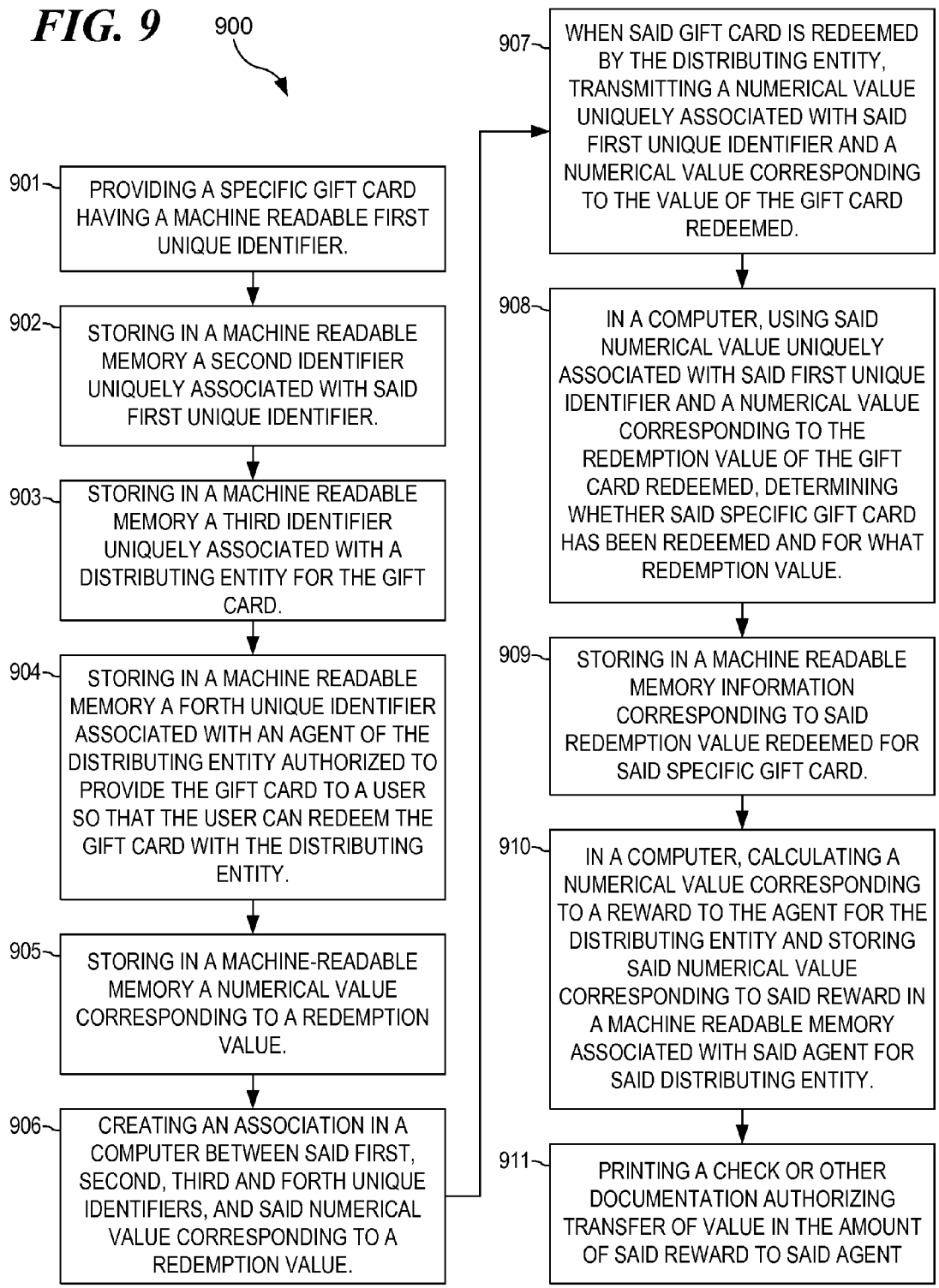

GIFT CARD AND REFERRAL CARD SYSTEM AND METHOD

CROSS-REFERENCE TO RELATED APPLICATIONS

This Application is a continuation-in-part of, and claims the benefit of the filing date of, co-pending U.S. patent application Ser. No. 12/842,143, entitled "GIFT CARD ENVELOPE SIMULATING APPEARANCE OF CURRENCY AND GIFT CARD REWARD SYSTEM" filed Jul. 23, 2010, which is a continuation of U.S. patent application Ser. No. 12/778,805, filed May 12, 2010 now abandoned, which claims the benefit of U.S. provisional patent application Ser. No. 61/177,551, filed May 12, 2009, the entire contents of all which are incorporated by reference herein by reference for all purposes.

BACKGROUND OF THE INVENTION

1. Field of the Invention

The present invention relates to gift cards and envelopes therefore. The present invention also relates to a system for facilitating referrals of customers through employment of gift cards through employment of customers.

2. Description of the Related Art

Merchants have devised many methods and devices for attempting to increase sales of the items or services they offer. For example, advertising, holding "sales" at discounted prices for at least some items, and providing discount coupons are some commonly used methods.

Merchants may use discount coupons in a variety of contexts. For example, discount coupons may be printed along with an advertisement in a newspaper or magazine. Discount coupons may also be provided at a sales counter, handed out personally and available on the internet and via email.

"Gift certificates" have characteristics of discount coupons in that they are typically only valid for purchasing products or services from a particular merchant or group of merchants, and also have some characteristics of currency, in that that they typically have a particular dollar value.

"Gift cards" represent a recent improvement over gift certificates. "Gift cards" typically look like credit or debit cards and have either a coded number, bar code, computer-readable magnetic strip, or the like. This allows each gift card to act like a separate "account" with an initial value in dollars, when activated.

Gift cards are typically given a value in dollars (or other currency) at the time of activation. That is, a user uses the gift card to purchase items at a store for a merchant accepting the gift card, and the amount of the purchase is deducted from the "account" associated with the card (the parameters of which are stored on a computer). Gift cards may either be purchased (for example, as a birthday gift) or may be given away for promotional purposes, in a similar manner to discount coupons. That is, a merchant may provide free gift cards, in return for the consumer doing something desired by the merchant. For example, a merchant may provide a free gift card having a value of $10, $50, $100 or some other amount, but that is valid only one day or expiring by a certain date, i.e. before December $25^{th}$ during the Christmas season. The hope for the merchant is that the person receiving the card will come into the store on that one day or during a certain time period to buy something that will give the merchant more overall profit than the cost of the gift card, even though that person was not planning on going into the store to buy anything at that location in the near future until the person received the gift card. By making the card valid on only for a certain time, it creates some "fear of loss" on the part of the person receiving the card, since the value of the card will be zero if not used during the dates of validation.

The problem with using gift cards for promotional purposes is that consumers are inundated with so many marketing messages, sales events, advertising and other promotional efforts by merchants that it is difficult for a particular merchant to hold the attention of a person in the target market long enough to deliver the promotional material. For example, in the case of gift cards, in particular, a merchant may provide a $10 gift card for a particular promotional. However, to a person receiving many, many promotions, the person may not even notice the gift card offering on a sales counter. Or, if the person receives the gift card, the person may easily ignore, or lose, the gift card. In such a case, the promotional value of the gift card is lost. That is, the merchant failed to induce the person to come into the store to buy something. Even if the gift card was purchased by someone (for example, as a birthday gift), it is easy for the recipient to ignore, or lose, the gift card, because its value is easily forgotten or not noticed.

In addition, generally, salespeople can have a hard time when confronted with a potential customer who simply replies "sorry, just looking" The salesperson is typically put into a quandary and unsure of how to continue. This can create problems for salespeople, as sales are typically regarded as the sine qua non of salesmanship.

For example, many people have been involved in a retail sale, whether as a casual shopper, retail sales person, or anywhere in between. As a result, most of us are well aware of the four phrases that sales people can fear the most when assisting customers and attempting to make sales. They are:

"No thanks, I am just looking"

"It costs more than I expected."

"Thanks, but I really need to shop around."

"I need to think it over."

Collectively these terms are referred to as "killer phrases" due to their ability to inhibit sales, as each of the phrases normally results in the sales person being left defenseless, with no effective response, and the customer abandoned and free to walk out of the establishment with the money they intended on spending still in their pocket, instead of the stores' cash register.

The first of these killer phrases, "No thanks, I am just looking," usually follows a sales person asking a shopper: "Can I help you?" This instinctive rejection of assistance leaves most sales persons defenseless, usually prompting another popular instinctive response from the sales person to the effect of, "Ok, well if there is anything I can help you with, let me know." The remaining killer phrases, "It is a little more expensive than I thought," "Thanks, but I really need to shop around," or "I need to think it over," are also very effective ways of neutralizing the sales person's attempts to encourage purchases.

All four of these expressions generally leave shoppers unaccompanied and free to leave the business establishment without making the purchases they perhaps intended on making, and the sales person feeling powerless to persuade the shoppers into making those purchases, despite the fact that helping customers make purchases is a sine qua non of the sales person's responsibility.

SUMMARY OF THE INVENTION

It is a purpose of the present invention to provide method and apparatus for improving the effectiveness and usefulness of gift cards, particularly when used for promotional purposes.

In particular, one embodiment of the present invention provides an envelope or sleeve sized to receive a gift card, at least one side of said envelope or sleeve having an image simulating paper money.

In one embodiment, the image simulating currency is an image simulating at least a portion of an item of paper money.

In another embodiment, the item of paper money has a denomination representing the initial value of the gift card when activated.

In another embodiment, the envelope or sleeve has a second side having information identifying a particular merchant or group of merchants providing the promotion.

In another embodiment, the image simulating currency differs from legal tender in a manner sufficiently to not be considered counterfeit currency, but retains sufficient similarity to legal tender to attract enhanced attention on the basis of its similarity to legal tender. For example, the image could be that of a $100 bill, but with the picture on the $100 bill changed from the picture of Benjamin Franklin to a picture of the owner of the store, or it could be the same image as a legal tender $100 bill, but a significantly different color, such as orange.

In another embodiment, a computerized system for automatically providing rewards based on distribution and/or use of gift cards distributed by an agent for a distributing entity is provided, comprising the steps of:

providing a specific gift card having a machine readable first unique identifier associated with said agent for the distributing entity;

storing a machine readable second unique identifier associated with said specific gift card in a machine-readable memory;

storing a numerical value corresponding to a redemption value in a machine-readable memory;

creating an association in a computer between said first unique identifier, said second unique identifier and said numerical value corresponding to a redemption value;

determining whether said specific gift card has been redeemed and for what redemption value; and based upon the redemption value redeemed, storing data corresponding to a reward in a memory associated with said agent for said distributing entity; and printing a check or other documentation authorizing transfer of value in the amount of said reward to said agent.

In another aspect, a computerized system for automatically providing rewards to an agent for a distributing entity based on distribution and/or use of gift cards by the agent for a distributing entity is provided, comprising the steps of:

providing a specific gift card having a machine readable first unique identifier, storing in a machine readable memory a second identifier uniquely associated with said first unique identifier;

storing in a machine readable memory a third identifier uniquely associated with a distributing entity for the gift card;

storing in a machine readable memory a forth unique identifier associated with an agent of the distributing entity authorized to providing the gift card to a user so that the user can redeem the gift card with the distributing entity;

storing in a machine-readable memory a numerical value corresponding to a redemption value;

creating an association in a computer between said first, second, third and forth unique identifiers, and said numerical value corresponding to a redemption value;

when said gift card is redeemed by the distributing entity, transmitting a numerical value uniquely associated with said first unique identifier and a numerical value corresponding to the value of the gift card redeemed;

in a computer, using said numerical value uniquely associated with said first unique identifier and a numerical value corresponding to the redemption value of the gift card redeemed, determining whether said specific gift card has been redeemed and for what redemption value;

storing in a machine readable memory information corresponding to said redemption value redeemed for said specific gift card;

in a computer, calculating a reward value corresponding to a reward to the agent for the distributing entity and storing said numerical value corresponding to said reward in a machine readable memory associated with said agent for said distributing entity; and printing a check or other documentation authorizing transfer of value in the amount of said reward to said agent.

In another embodiment, it is a purpose of the present Application to describe a system that can help alleviate at least some of the problems of conventional sales systems.

In particular, one embodiment of a system provides a referral acceptor; a referral coordinator coupled to the referral acceptor; a referral calculator coupled to the referral calculator; and an input/output ("I/O") device coupled to the referral coordinator. The referral acceptor is configured to accept a referral card. The referral card has a referrer identifier that identifiers a referrer of a holder of the referral card In one embodiment, a method provides completing a referral card application having a referrer identifier for a merchant; registering the referral card application; referring, by the referrer, a referred customer to the merchant with the referral card; registering the referral card of the customer in their own account which resisters purchases and applies a gift card value associated with the referral card for that account; and crediting value to the referrer's account.

In another embodiment, a method provides enrolling in a referral card program by a merchant; validating the information enrolled by the merchant; presenting a list of options to customize a referral card; and selecting by the merchant from the list of options for the referral card.

BRIEF DESCRIPTION OF THE DRAWINGS

For a more complete understanding of the present invention and the advantages thereof, reference is now made to the following Detailed Description taken in conjunction with the accompanying drawings, in which:

FIG. 9 is a block diagram showing the steps of another embodiment of a computerized system for automatically providing rewards to an agent for a distributing entity of a gift card.

DETAILED DESCRIPTION

In the following discussion, numerous specific details are set forth to provide a thorough understanding of the present invention. However, those skilled in the art will appreciate that the present invention may be practiced without such specific details or with variations therein.

Figure 1:
FIG. 1 depicts one side of an envelope sized to receive a gift card, having an image simulating a $100 bill of United States paper money printed thereon, and having a gift card received therein.

Turning now to the figures, and initially to FIG. 1, an envelope or sleeve 100 sized to receive a gift card 5 is depicted, having an image 7 simulating a $100 bill of United States paper money printed on a first side 9 thereof. Although in FIG. 1, the image 7 closely resembles a portion of a legal tender $100 bill, it is to be understood that the image simulating currency can be made to differ from legal tender in a manner sufficiently to not be considered counterfeit currency, but to retain sufficient similarity to legal tender to attract enhanced attention on the basis of its similarity to legal tender. For example, the image could be that of a $100 bill, or any other denomination, but with the picture on the $100 bill changed from the picture of Benjamin Franklin to a picture of the owner of the store, or it could be the same image as a legal tender $100 bill, but a significantly different color, such as orange.

In one embodiment, the denomination of image 7 simulating the currency is the same denomination as the value of the gift card 5 when activated. Thus, in FIG. 1, the denomination of the gift card 5 would be $100 dollars in United States currency. However, it is not necessary that the denominations of the paper money be the same as the denomination as the value of the gift card 5 when activated.

Figure 2:
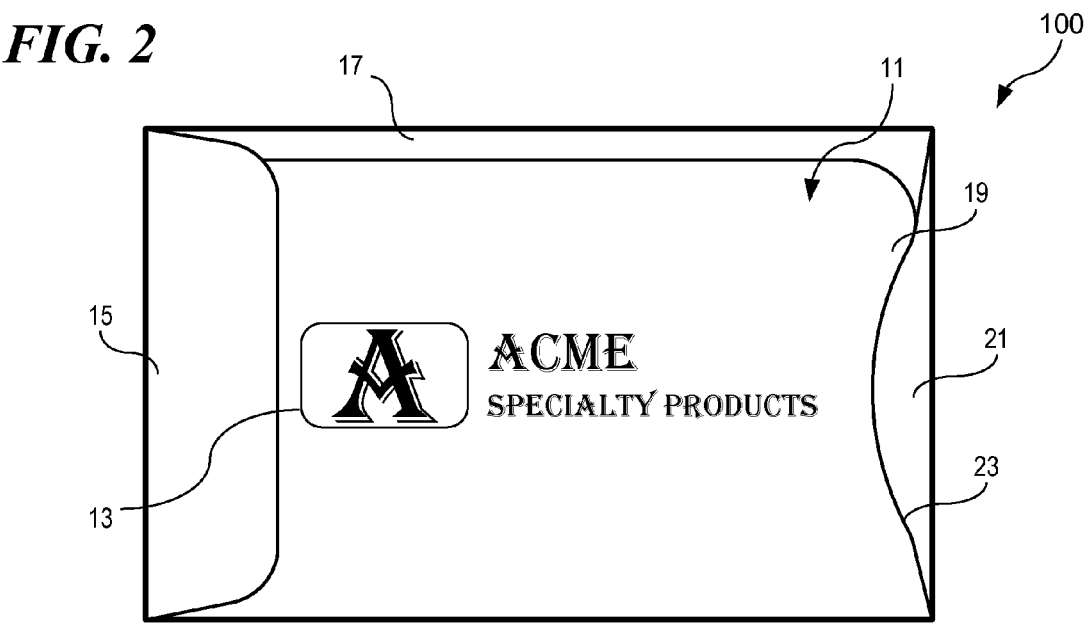
FIG. 2 depicts a second side of the envelope depicted in FIG. 1, having an envelope sized to receive a gift card, having information identifying a particular merchant or group of merchants providing the promotion printed thereon.

FIG. 2 depicts a second side 11 of the envelope 100 depicted in FIG. 1. In this embodiment, the second side 11 has information 13 identifying a particular merchant or group of merchants providing the promotion printed thereon. That is, the identified merchant or group of merchants would be those that accept the gift card, or those that paid for the gift card for advertising or other purposes.

The envelope 100 can be comprised of a single piece of sheet material, such as paper or plastic, which is folded and glued together with adhesive. In this embodiment, the envelope 100 has a flap 17 folded first, then a flap 19 folded over it and attached to flap 17 with an adhesive. Then, a bottom flap 15 can be folded over both flaps 11 and 17 and glued to at least flap 19 to hold the envelope together.

The envelope 100 can also include a recess 23 at the open end of envelope 100, to allow a person to see the gift card 5 therein, and to more easily grasp and remove the card 5 from the envelope 100. It should be noted that the recess 23 can be provided on only the second side 11 of the envelope; the side that does not have the image 7 simulating currency. This is different from conventional gift card envelopes, which have an indentation for your thumb and forefinger to grasp the gift card on both the front and the back of the envelope. However, in the present invention, the first side 9 preferably has a substantially straight edge at the opening, which results in the side having the image 7 simulating currency look more realistic.

The envelope 100 can be sized such that a gift card 5 will fit within envelope 100 with substantially no portion of the gift card 5 visible from the first side 9 of the envelope, or the envelope 100 can be sized such that a portion of the gift card 5 will be visible from the first side 9 of the envelope. Of course, other envelope configurations and other means of making the envelope 100 used to retain the gift card 5 can be used.

Figure 3:
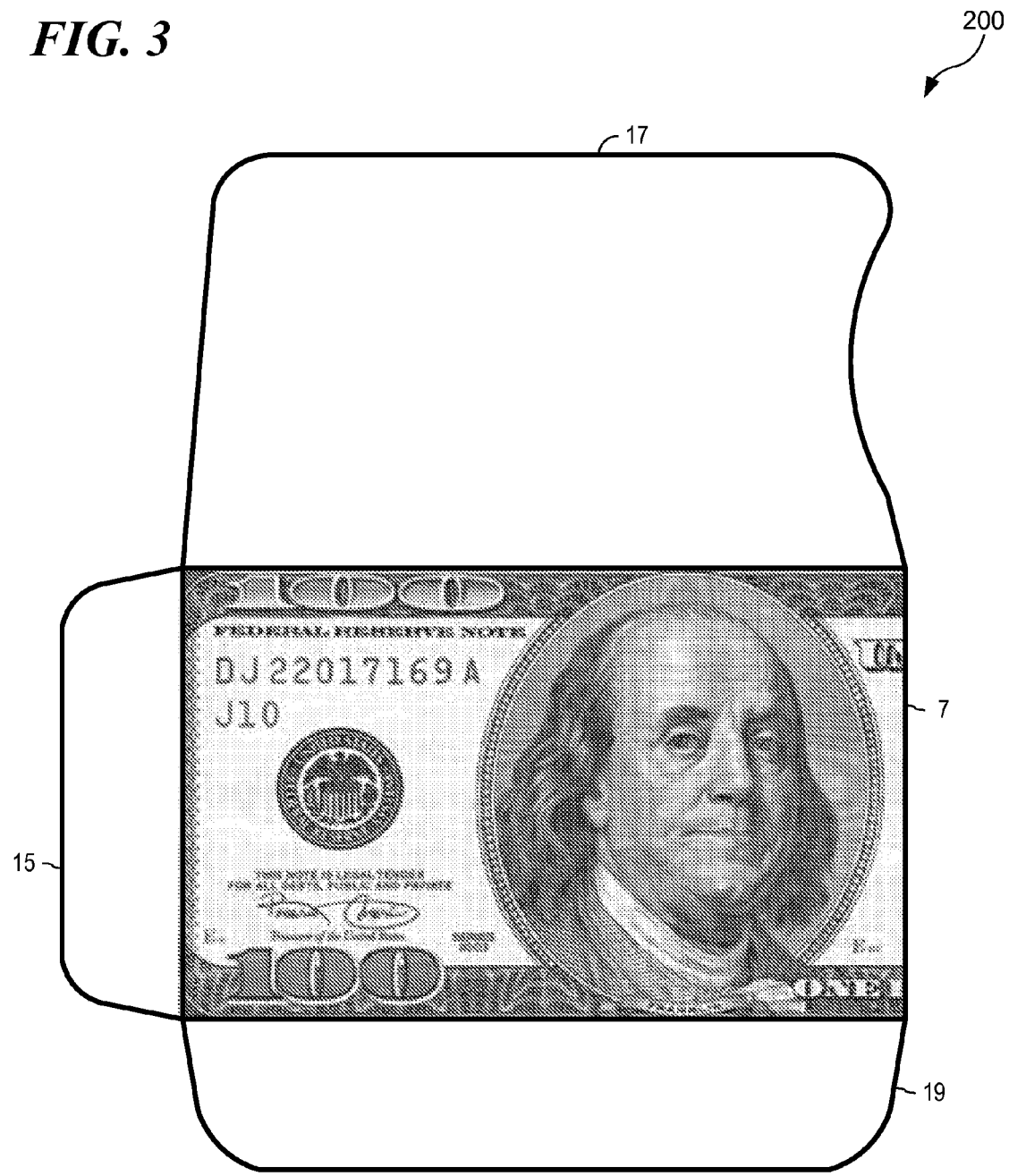
FIG. 3 depicts the envelope of FIG. 1, in an unfolded condition.

FIG. 3 depicts the sheet material blank 200 for envelope 100 of FIG. 1, in an unfolded condition. Blank 200 has an image 7 simulating a $100 bill of United States paper money printed on a first side 9 thereon, a flap 19, a flap 15 and a flap 17 in their unfolded conditions, all of which can be folded over and glued with adhesive, as described with respect to FIG. 2. FIG. 3 does not depict information 13 identifying a particular merchant or group of merchants providing the promotion printed thereon, for clarity of FIG. 3, but such information could be included, if desired. The unique design of the gift card assembly of the present invention and the unique sales method that can employ the gift card assembly allows the gift card of the present invention to function as a traditional gift card, which can be considered a "passive" gift card plan, similar to a gift certificate, but also to function in an "active" gift card program.

Figure 4:
FIG. 4 depicts one side of another envelope sized to receive a gift card, having an image simulating $100 bill of United States paper money printed thereon, and having a gift card received therein.
Figure 5:
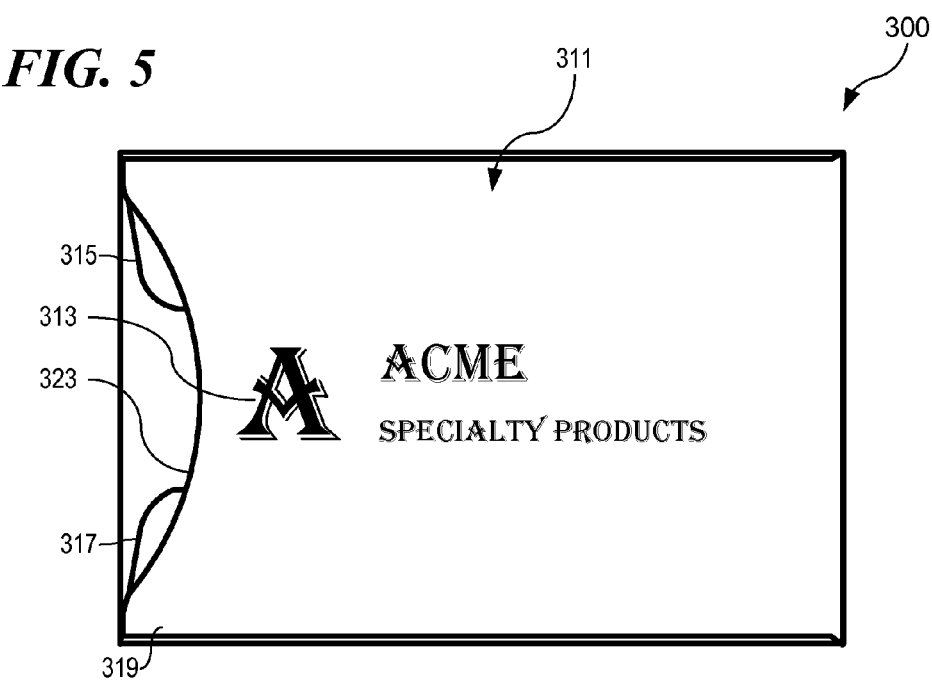
FIG. 5 depicts a second side of the envelope depicted in FIG. 4, having an envelope sized to receive a gift card, having information identifying a particular merchant or group of merchants providing the promotion printed thereon.

In another embodiment depicted in FIG. 4, an envelope or sleeve 300 is preferably sized to receive a gift card 305, and may have an image 307 simulating a bill of United States paper money printed on a first side 309 thereof. A second side 311 of the envelope 300 may have information 313 identifying a particular merchant or group of merchants providing a promotion printed thereon, as shown in FIG. 5. The envelope 300 can also include a recess 323 at the open end of envelope 300, to allow a person to see the gift card 305 therein, and to more easily grasp and remove the gift card 305 from the envelope 300. The recess 323 can be provided on only the second side 311 of the envelope, as described above with respect to envelope 100.

Figure 6:
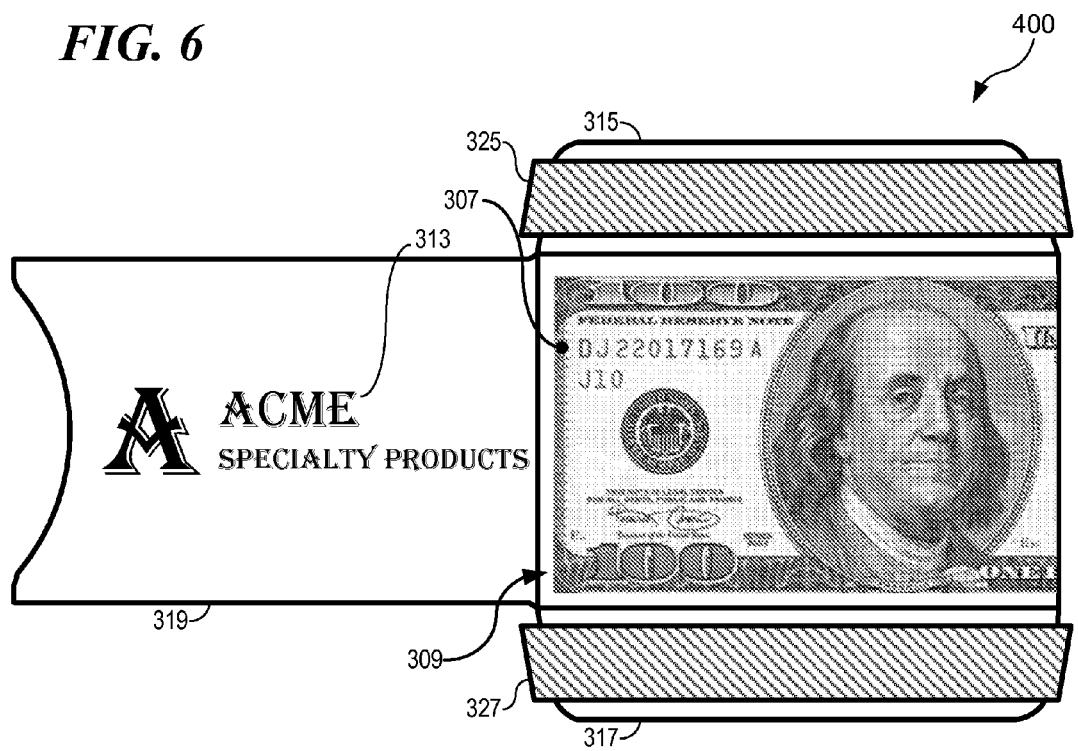
FIG. 6 depicts the envelope of FIG. 4, in an unfolded condition.

FIG. 6 depicts a sheet material blank 400 for envelope 300 of FIG. 4, in an unfolded condition. Blank 400 has an image 307 simulating a $100 bill of United States paper money printed on a first side 309 thereon, a first flap 315, a second flap 317, and a third flap 319 in their unfolded conditions. In an embodiment, the first flap 315 may be provided with a first adhesive strip 325, and the second flap may be provided with a second adhesive strip 327. The adhesive strips 325, 327 may preferably extend along a length of first flap 315 and second flap 317, respectively. In the embodiment shown in FIGS. 4-6, the envelope 300 may be formed by folding the flaps 315, 317 and 319 of sheet material blank 400 in a certain order. In this embodiment, first flap 315 and the second flap 317 may be folded over away from first side 309 bearing the image 307. Then, third flap 319 may be folded over both flaps 315 and 317, and adhered to first flap 315 and second flap 317 utilizing adhesive strips 325, 327 to complete the envelope 300.

In current, traditional gift card programs available to businesses, the gift cards are designed to sit on a rack by the register, unactivated, hoping people choose to add one to their purchases or buy one as a gift for someone in lieu of picking out a particular item. Likewise, gift certificate programs usually allow certificates to sit in a drawer awaiting requests from customers to buy one.

The benefit promoted by gift card sales companies to the business is that gift cards are in view for customers to see. Thus, the gift cards have a promotional value as advertising, as an inducement for the card recipient to go to the business to redeem the card. Furthermore, businesses earn profits when gift cards are sold and then lost such that they are never redeemed.

When someone loses a gift certificate, the information for which is contained in the company records, the business is responsible for researching and reissuing the gift certificate. Whereas, the gift card contains all the information in the magnetic strip, leaving the business helpless in reissuing the card, while also keeping the value of the lost gift card.

In the present invention, the gift card assembly can be used in an "active" gift card program that allows business owners and their employees alike to hand out gift cards wrapped in the envelopes depicting various denominations of imitation United States currency that contain various values, as a promotion to drive new customers into the business establishments, which can be a different business than the one actually handing out the card. The image of simulated currency encourages the recipient to keep, and read, the card that he or she has been handed, even if the recipient is not near the business to be promoted (i.e., which will redeem the card) at the time the recipient receives the card. How this would be done is described in the following example:

Example: While going to the grocery store a person at the grocery store, such as a person buying groceries (who is an employee or is otherwise an agent of or person working for the business being promoted), gives a gift card in the envelope showing $100 to the person at the cash register checking their groceries. The person can say something like, "Thanks for helping me, I want to give you this, it is a gift card to Bill's Automotive, as he turns the card over and shows the other side which says something like, "This card has a value of $1 to $100 at Bill's Automotive" as well as the address, phone number and pertinent information of Bill's Automotive. Then they would say something like, "Stop by and redeem your card", or "Stop by and see the value when you get a chance," or, "Next time you need work done on your vehicle, stop by and see how much you will save" etc.

The gift cards in such an active program can also include codes uniquely associated with the employee or agent of the business being promoted that is responsible for distributing the cards. The business owner then also has the option to reward the person handing out the gift card with something of value, which can be a fixed amount of money for each card they give away, though this is not preferred, or the more preferred way of providing a reward when cards are redeemed. The reward can be a percentage of the purchase price on redeemed cards (highly recommended), fixed amount or other way of determining the reward.

In this active program, a business, rather than waiting for customers who are already familiar with their business to buy a gift certificate or gift card and give it away as a gift to someone they know, the present active card program allows both the business employer as well as its employees or other agents as the vehicle to "actively" generate new business by creating new customers outside of their establishment who (a) were not aware of their business and (b) who, quite possibly, never would have frequented their business.

Figure 7:
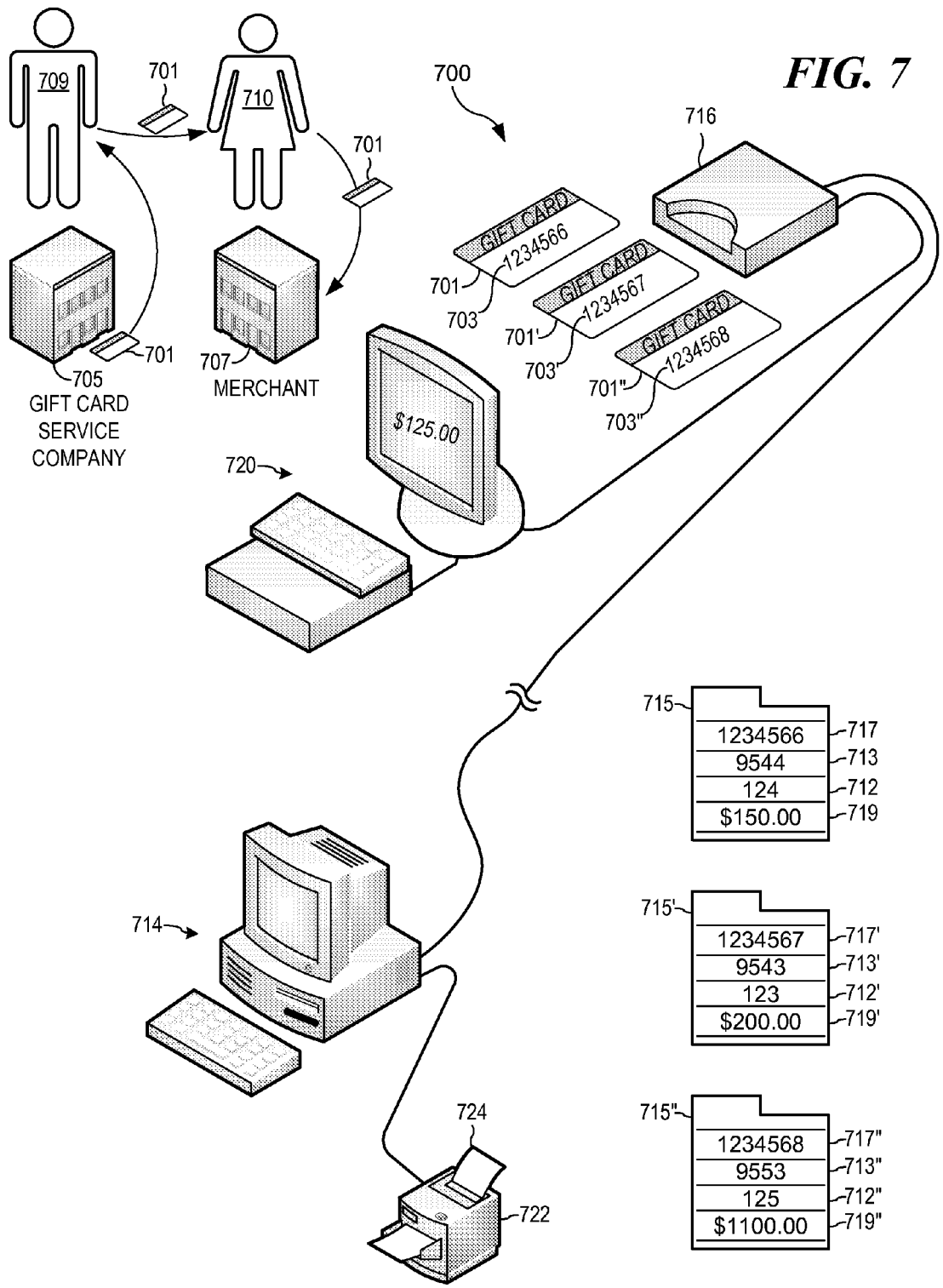
FIG. 7 is schematic diagram showing an exemplary embodiment of a system for performing steps of an embodiment of a computerized system for automatically providing rewards to an agent for a distributing entity of a gift card.

The invention can be readily used in a computerized system 700 for automatically tracking and providing rewards to agents of a business being promoted. Turning to FIG. 7, an embodiment of such a system including a computerized system for automatically providing rewards to an agent of a distributing entity based on distribution and/or use of gift cards distributed by an agent for the distributing entity is depicted. The system includes a plurality of gift cards 701, 701' and 701". Gift cards 701, 701' and 701" can be essentially identical except for the machine readable first unique identifier 703, 703' and 703" that are, respectively, applied to each card and which are unique for each card. Although only three cards are depicted, it is to be understood that the system will, in generally, have any number of cards. Since the cards 701, 701' and 701" are identical except for their first unique identifiers 703, 703' and 703", for convenience generally only card 703 and its first unique identifier 703 will be further discussed, although it is to be understood that the discussion applies equally to cards 701', 701" and their unique identifiers 703', 703". It should also be understood that, although it is beneficial to use the card 5 and envelope 100 in the invention, any type of card having a machine readable unique identifier 703 on it may be employed, with or without envelope 100 or any envelope.

Conveniently, the first unique identifier 703 is a machine readable number or information correlateable to a number, such as a bar code, a magnetically coded strip or the like. Typically, the cards 701 are produced or otherwise provided by a gift card service company 705, which handles the accounting distribution and redemption of the gift cards 701 on behalf of a merchant 707, which will ultimately redeem the card when it is brought to the merchant for redemption. Although only one merchant 707 is depicted, it is to be understood that the gift card service company 705 may conduct the computerized method of the present invention on behalf of many merchants 707.

In order to widely distribute the gift cards 701 on behalf of the merchants 707, the gift card service company may engage one or more agents 709, which are persons or companies, to distribute the cards 701 to persons 710 considered likely to be interested in the products or services of the merchant 707. In one embodiment of the computerized system 700, each merchant 707 has a unique identifier, such as his, her or its own unique merchant number 713, such as the numbers 9544, 9543 and 9553 depicted as numerical entries stored in the memory of computer 714 in its database.

In one embodiment of the computerized system 700, each agent 709 has a unique identifier, such as his, her or its own unique agent number 712, such as the numbers 123, 124 and 125 depicted as numerical entries stored in the memory of computer 714 in its database 715. Of course, as indicted above, the gift cards 701 can also include a machine readable identifier uniquely associated with the employee or agent 709 of the distributing entity, i.e., business being promoted that is responsible for distributing the cards. Also, the identifier uniquely associated with the employee or agent 709 can also form a part of the first unique identifier 703.

The database 715 also has stored therein a number or other information 717 that corresponds to the first unique identifier 703, or a coded or encrypted version thereof. In the database 715, the number or other information 717 that corresponds to the first unique identifier 703, or a coded or encrypted version thereof, is associated with the agent number 712, the merchant number 713, and that amount of redemption value 719 currently on the gift card. It should be noted that the amount of redemption value 719 can be a monetary amount, or it can be representative of goods or services. For example, the redemption value could be a free tank of gas with purchase of an oil change service. In such a case, the redemption value 719 may be a code that represents the right to obtain a free tank of gas, without necessarily being directly relating to an exact amount of money.

When a person 710 redeems the card 701 that has been provided to the person 710 by an agent 709 at the merchant 707, the first unique identifier 703 on card 701 is read by card reader 716. Card reader 716 then transmits the first unique identifier 703, or a coded or encrypted version thereof, to computer 714, which would typically be maintained at the gift card service company 705, or otherwise under its control. Cash register 720 also transmits to the computer 714 information corresponding to the value on gift card 701 sought to be redeemed. The computer 714 then looks in its database 715 for an entry corresponding to the first unique identifier, or a coded or encrypted version thereof. If there is a match, the computer 714 deducts the amount of the redemption from the value 719 associated with that card's the number or other information 717 that corresponds to the first unique identifier 703 and updates the amount of value 719. The computer 714 then sends data to the merchant's cash register 720 acknowledging the transaction and the value redeemed. The merchant would then provide the goods are services (not shown) to the person 710 corresponding to the value redeemed (or to some other greater or lesser value, as predetermined by the merchant or required by contract or law).

In order to create an incentive for agents 709 to distribute the gift cards 701 to persons considered likely to be interested in the products or services of the merchant 707, the agent 709 is compensated by a fee or other reward having a redemption value when a card 701 is redeemed at the merchant 707 by person 710. In accordance with the invention, the agent 709 can be compensated automatically. This is accomplished by computer 714 periodically interrogating its database 715 for the amount of redemptions associated with each agent 709's unique identifier 712. The total amount of redemptions for each agent can then be totaled to compute a reward, based upon a fee, percentage or other basis to which the agent is entitled. Computer 714 can then send that information to a printer 722 to print check 724 for agent 709. Of courses, although a printer 722 and paper check 724 are depicted, electronic transfer of funds into the agent's bank account could also be accomplished, with appropriate electronic documentation in lieu of a paper check 724.

Figure 8:
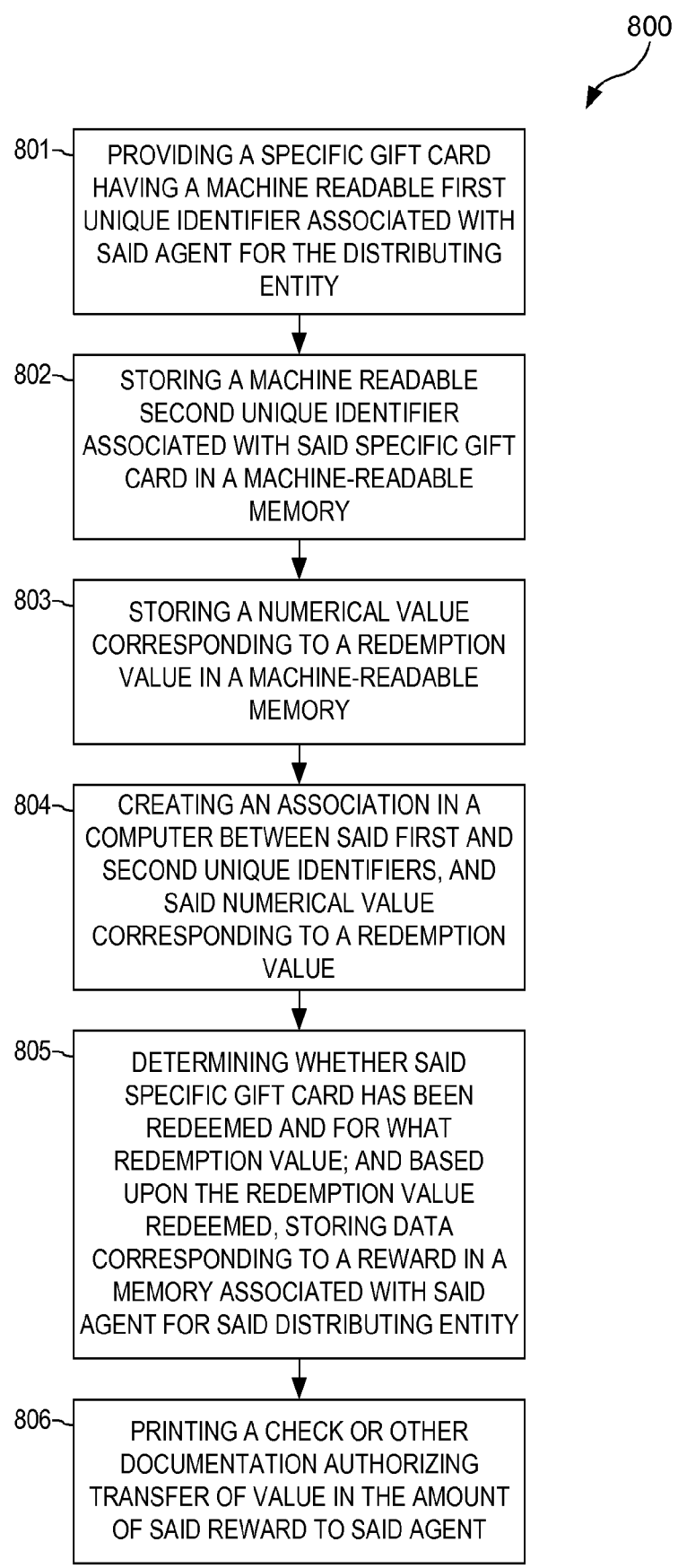
FIG. 8 is a block diagram showing the steps of an embodiment of a computerized system for automatically providing rewards to an agent for a distributing entity of a gift card.

Referring now to FIG. 8, a simplified block diagram of a computerized system for automatically providing rewards based on distribution and/or use of gift cards distributed by an agent for a distributing entity is depicted. Step 801 shows step of providing a specific gift card having a machine readable first unique identifier associated with said agent for the distributing entity. Step 802 is storing a machine readable second unique identifier associated with said specific gift card in a machine-readable memory. Step 803 is storing a numerical value corresponding to a redemption value in a machine-readable memory. Step 804 is creating an association in a computer between said first unique identifier, said second unique identifier and said numerical value corresponding to a redemption value. Step 805 is determining whether said specific gift card has been redeemed and for what redemption value; and based upon the redemption value redeemed, storing data corresponding to a reward in a memory associated with said agent for said distributing entity. And step 806 is printing a check or other documentation authorizing transfer of value in the amount of said reward to said agent.

In another embodiment, depicted in FIG. 9, a computerized system for automatically providing rewards based on distribution and/or use of gift cards distributed by an agent for a distributing entity is depicted. In this embodiment, step 901 is the step of providing a specific gift card having a machine readable first unique identifier. Step 902 is storing in a machine readable memory a second identifier uniquely associated with said first unique identifier. Step 903 is storing in a machine readable memory a third identifier uniquely associated with a distributing entity for the gift card. Step 904 is storing in a machine readable memory a forth unique identifier associated with an agent of the distributing entity authorized to provide the gift card to a user so that the user can redeem the gift card with the distributing entity. Step 805 is storing in a machine-readable memory a numerical value corresponding to a redemption value. Step 806 is creating an association in a computer between said first, second, third and forth unique identifiers, and said numerical value corresponding to a redemption value. In Step 807, when said gift card is redeemed by the distributing entity, the method transmits a numerical value uniquely associated with said first unique identifier and a numerical value corresponding to the value of the gift card redeemed. In step 808, in a computer, said numerical value uniquely associated with said first unique identifier and a numerical value corresponding to the redemption value of the gift card redeemed are used to determine whether said specific gift card has been redeemed and for what redemption value. Step 809 is storing in a machine-readable memory information corresponding to said redemption value redeemed for said specific gift card. In step 810, in a computer, the method calculates a numerical value corresponding to a reward to the agent for the distributing entity and stores said numerical value corresponding to said reward in a machine readable memory associated with said agent for said distributing entity. In step 811, information is transmitted by computer 714 to a printer or other electronic documentation device to printing a check or other document authorizing transfer of value in the amount of said reward to said agent.

Figure 10A:
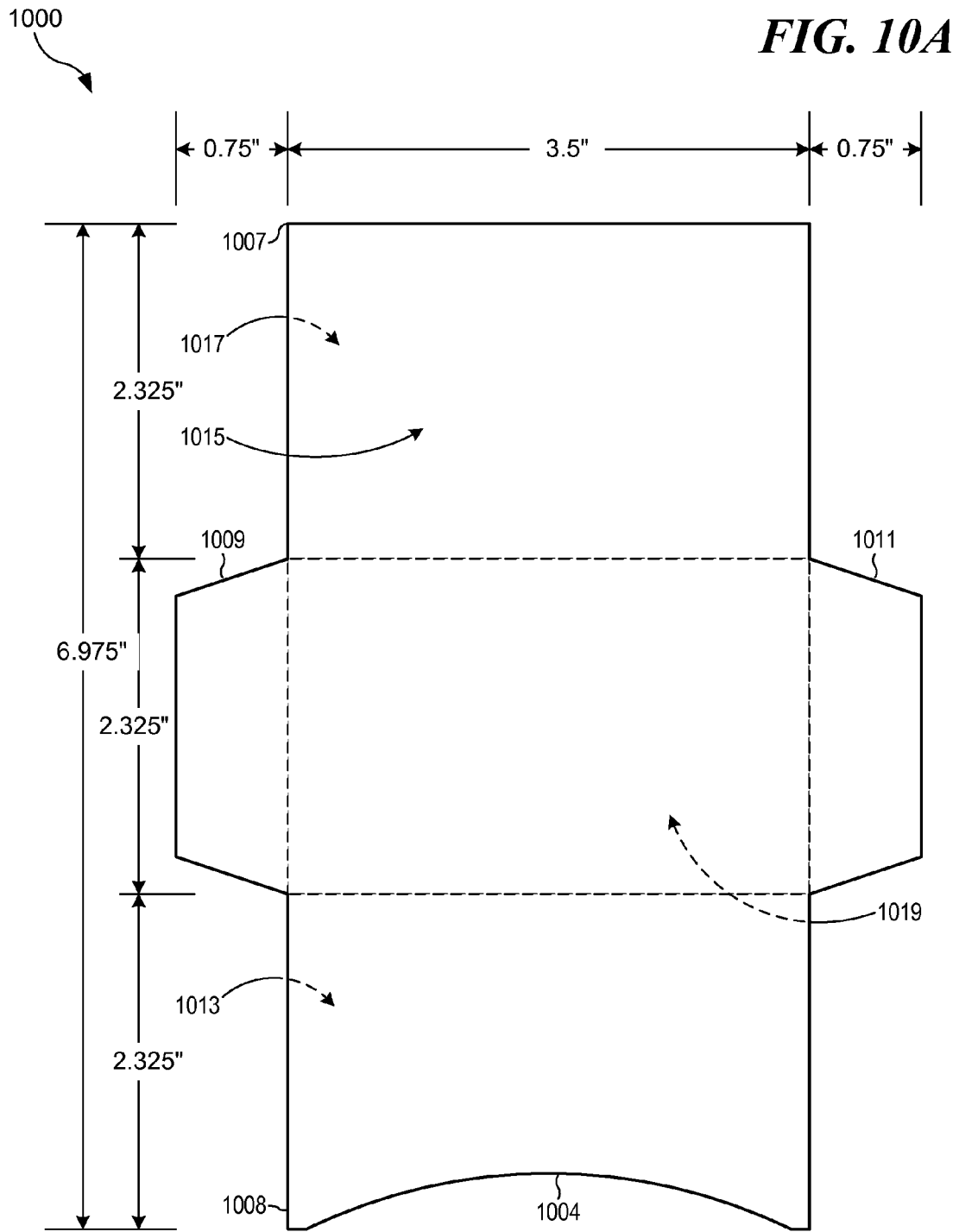
FIG. 10A depicts a referral card sleeve in accordance with an embodiment of the present invention, in an unfolded condition.
Figure 10B:
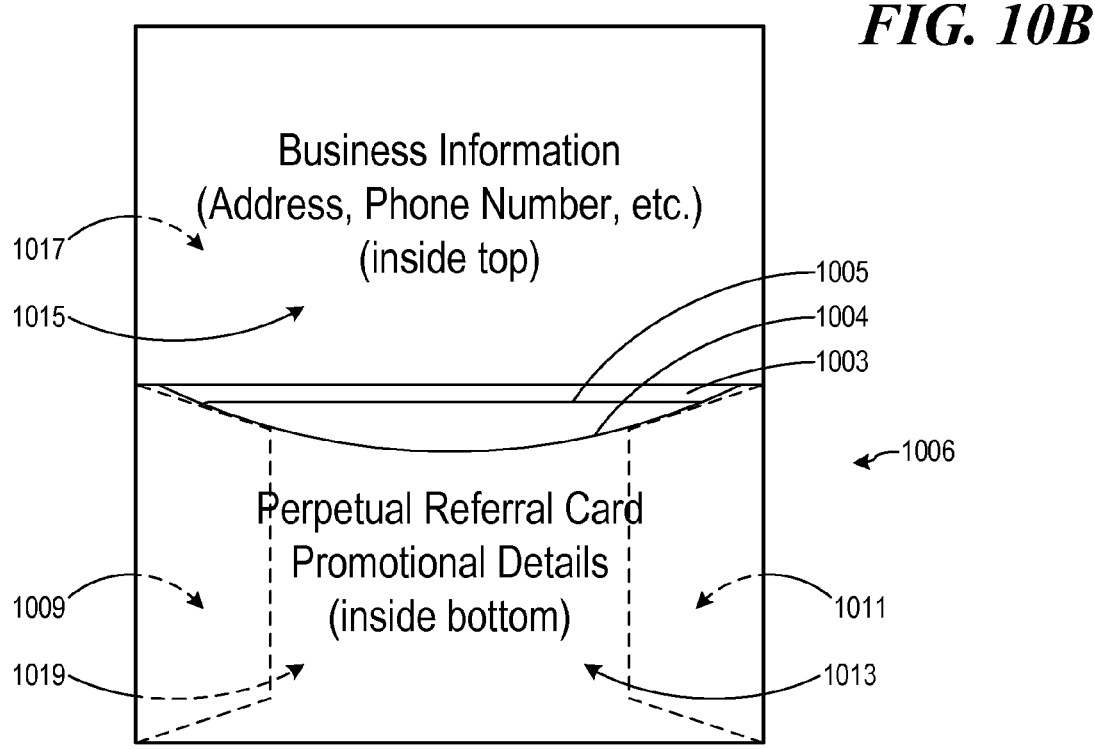
FIG. 10B depicts the front and back of the referral card envelope depicted in FIG. 10A in a folded-together condition as an envelope for the referral card to be used in accordance with an embodiment of the present invention.
Figure 10C:
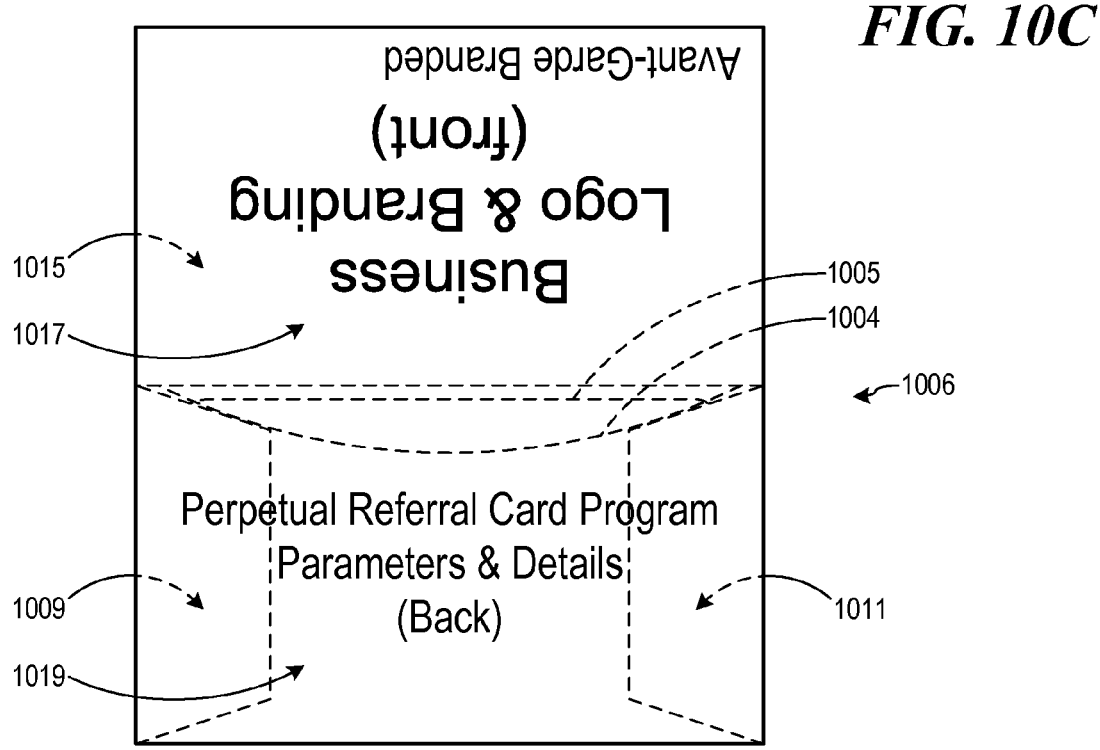
FIG. 10C depicts the front and back of a referral card to be used in accordance with an embodiment of the present invention.

Turning now to FIGS. 10A, 10B and 10C, a referral card sleeve 1006 in accordance with an embodiment of the present invention is depicted. Sleeve 1006 has some similarities to the envelope 100, but also includes a covering flap 1007 and preferably can have additional or different information printed on the envelope.

Referring first to FIG. 10A, a sheet material blank 1000 referral card sleeve 1006 is depicted in an unfolded and unassembled condition. As depicted sleeve 1006 can be comprised of a single piece of sheet material 1000, such as paper or plastic, which is then folded together and glued. In this embodiment, the blank 1000 for sleeve 1006 has flaps 1009 and 1011 which are preferably folded over first. Then, flap 1008 is folded over and attached to the folded over flaps 1009 and 1011 with an adhesive. This forms a pocket 1003 for receipt of a card, such as card 5, 305, card 1005, or other card having either or both of printed and/or electronically coded information thereon.

As depicted in FIGS. 10A and 10B, sleeve 1006 preferably has recess 1014 to facilitate placement and removal the card. Folding over flaps 1009 and 1011 first allows flap 1008 to conceal flaps 1009 and 1011. Alternatively, flap 1008 could be folded over first and flaps 1009 and 1011 glued to the outer face 1013 of flap 1008. When envelope 1006 is assembled and glued together, flap 1007 can be optionally folded over glued-together flap 1008, to form a folded-over cover, like the cover of a book, but flap 1007 need not, and preferably is not, glued onto any of flaps 1008, 1009 or 1011. This allows flap 1007 to be opened and closed, like the cover of a book.

Turning now to FIG. 10B, the referral card sleeve 1106 depicted assembled and folded, but with flap 1007 opened. As depicted in FIG. 10B, the face 1013 of flap 1008 is exposed, as is the outside face 1015 of flap 1007. Referral card envelope 1006 can promotional details for the referral program of the present invention printed on the face 1013 of flap 1008 and the outside face 1015 of flap 1007. Of course, the information could be placed on either of the faces 1013 or outside face 1015, or reversed, and is not limited to the information described.

Turning now to FIG. 10C, the sleeve 1006 depicted in FIG. 10B is depicted flipped over which flap 1007 opened as it is in FIG. 10B, so that the back 1119 of the envelope and inside face 1017 of flap 1007 can be seen. Of course, the inside face 1017 of flap 1007 would be concealed when flap 1007 is folded over. The back 1019 of envelope and inside face 1017 of flap 1007 can also have information placed thereon, such as business logo, branding information, perpetual referral card program parameters and details and the like. Of course, the information on any of 1013, 1015, 1017 or 1019 could be interchanged, and is not limited to the information described.

Figure 11:
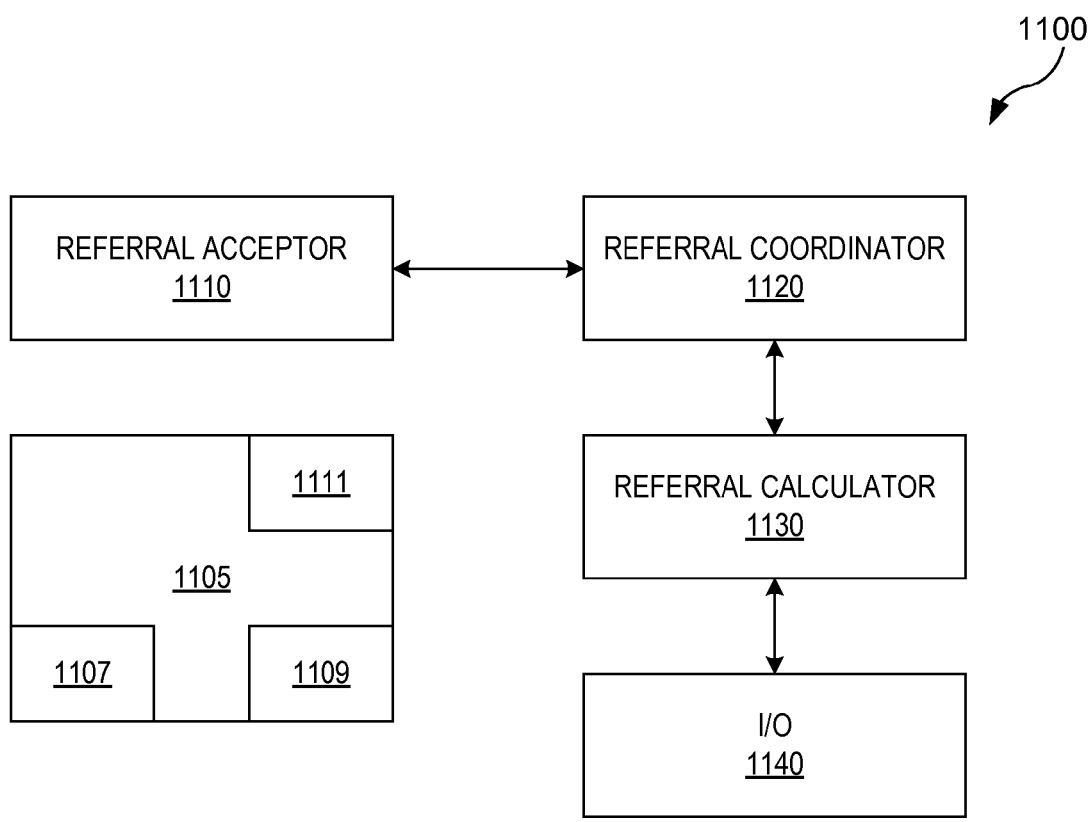
FIG. 11 depicts a block diagram showing an embodiment of a computerized referral system for automatically providing rewards to an agent for a distributing entity of a referral card.

Turning now to FIG. 11, illustrated is an embodiment of a referral system 1100, including a computerized system, for automatically providing rewards for referrals. In the referral system 1100, a referral acceptor 1110 is coupled to a referral coordinator 1120. Generally, the referral acceptor 1110 allows for a merchant to enter referrals, such as represented by a referral card 1005, that have been distributed by various agents, including referring customers, of a merchant to another customer.

A "referrer" is the referrer identified in the referrer ID 1107; the "holder" is whoever is using the card to make a purchase, and may be programmed and indicated in referred ID 1109. Therefore, a referring customer for a given card is not a holder of the card, although they are the referrer indicated in the referrer ID of the distributed referral card 105.

The referral card can include an identifier correlated to the agent. In one embodiment, the referral card 1005 includes a referrer ID 1107 that refers to the referrer of a referred customer, the customer who is using the referral card 1005. In a further embodiment, the card can also include a referred ID 1109 that refers to the referred customer. The referral card 1005 can convey a benefit to both the referred customer, such as a discount, and the referring customer, such as a credit for referring the referred customer.

The referral coordinator 1120 validates the various referrals, as will be further described, below. A referral calculator 1130, coupled to the card coordinator 1120, assigns value to the referring agents account. The referral process 1130 can then output this information on input/output device 1140. In one embodiment, the card coordinator 1120 also oversees the manufacturing and distribution of these cards. Accounting software can be installed in the referral coordinator 1120 and the referral calculator 1130.

Generally, the referral system 1100 of the present Application gives a commission or other type of earning or benefit resulting from sales made to a referred customer from a referring customer or agent, and can be paid to the referring customers in a variety of ways, as well as the benefits that accrue to an actual user of the referral card 1005. The referral can be tracked by the referral ID 1107, as will be described below. Moreover, the referral system 1100 also gives participating customers, both referring and referred customers, the incentive to buy more and spend more, as they realize the opportunity to reduce their expense through active promotion of the business.

In one embodiment, the referral system 1100 is employed with a gift card referral system, although other reward systems are also possible. In another embodiment, the referral system 1100 incorporates specifically engineered accounting software that can work in with the Referral card, sleeve and system that is the subject of U.S. patent application Ser. No. 12/842,143, the contents of which are incorporated herein by reference. In one embodiment, referral cCards, which are similar to gift cards or credit cards, are inserted into custom Referral Card Sleeves which describe particular aspects of the Referral Program. For more information, please see "GIFT CARD ENVELOPE SIMULATING APPEARANCE OF CURRENCY AND GIFT CARD REWARD SYSTEM," as incorporated above. That application contains specific details and promotions regarding the referral card, sleeve and system that the present invention is designed to work in conjunction with, although it can work with other gift cards and systems as well.

It is an objective of the present Application to increase sales through employment of customers themselves as the agents, as discussed above. Generally, in the referral system 1100, this is performed through referrals performed by agents of a merchant. The agents can be customers who have been recruited to distribute reward cards. These agents receive referral cards 1105, which contained the referrer ID 1107 for the referring agents.

These referral cards (such as card 5 or 305 or other information bearing card 1005) that could be contained in envelope 100, 300 or sleeve 1006, or are then distributed by the referring agents to referred customers or potential customers, and the original, referring customer is awarded a reward based upon various criteria of the other customers or potential customers. The referrer is identified by the referrer ID 1107 of the card 1005. The loyalty and potential of repeat visits of a merchant can increase dramatically when they are enrolled in the referral system 1100, as the referral system 1100 establishes the incentive for their continued patronage as well as promotion of the business, as will be described below.

In one aspect of the referral system 1100, a commission earnings resulting from sales made to referred customers can be paid to the referring customer in a variety of ways. These ways can include such approaches as cash earnings, product discounts, in-store credit, or universal account credits that can be used in combination with other businesses, as part of a cooperative business networking promotion. The amounts can be credited with a flat rate or an escalating rate, which would be based upon the total amount of sales referred over a certain period of time. Higher percentages could be earned by referring customers under the escalating rate, in exchange for higher referred sales amounts produced within a particular time period such as the first two (2) weeks, first thirty (30) days, etc. There is an expanding variety of specifically tailored parameters available for businesses, allowing them to customize this program for their specific needs.

In another aspect of the referral system 1100, each card 1005 is programmed with both the referred ID 1109 and a personal account information 1111 of the referred shopper, and the earnings for the referring agent are generated from all referred customers who produce either the Referral Card 1005 or the Referral Card account number when making purchases from the issuing business. The referral system 1100 offers a variety of entry levels and is very flexible and customizable, allowing business owners in one embodiment the opportunity to issue a single referral card 105 and have referred customers produce the account number when making purchases, and in another embodiment offer multiple referral cards 1105 to be passed-on to the referred customers and returned by them when they make their purchases.

In yet another aspect of the referral system 1100, a number of referral cards 105 issued to each referring customer can be based on the amount of the original purchase, the customer's level of excitement, the amount they want to earn through the program, or any criteria the business owner would like to implement, with the details of the program being explained on the sleeve. The referral cards 1105 can then be distributed by the referring customers to their friends, family members, co-workers, and acquaintances, who are then motivated to benefit from the program as well by becoming a customer of the business and potentially becoming a promoter of the referral program themselves. If a substantial number of referral cards 1105 are distributed by a referring customer and then used by customer's referrals, the originating customer can be offered additional referral cards 1105 due to their effectiveness promoting the referral program.

As an additional aspect, in one embodiment, both single and multiple card accounts can be offered to include certain product discounts, at the business owner's discretion, while in another aspect, the multiple card accounts can also be offered with a random or variable discounts, the value of which can only be revealed when the referral card 105 is redeemed for purchase. An effect of these referral cards 1105 may be that tentative customers feel better about making purchases then and there, as they can now justify their purchase as a result of having the opportunity to earn the value of that purchase, or possibly even more, through referring other customers to that business.

In a further embodiment, when customers patronize a business as a result of being referred by a referrer of the referrer card 1005, the referred customer too can, in turn, establish their own new referral card 1005 account of their own, using the referral card 1005 with their own referrer ID 1107. The earnings from the referrals the referred person refers would then be credited to the original referral account and paid in the same manner as the person who originally referred them to that business, and the 'downline' referrer would also be credited as well for their further referrals. The customers that were referred also are given the opportunity to participate in and benefit from the referral system 1100, as would the new and referred customers, creating a potential perpetual stream of new customers patronizing the business and referring more new customers who do the same, as a result of the program.

In one embodiment of the present invention, the card 1005 of the referring customer used in the referring customer's own purchases is the same referral card 1005 that is given out to referred customers. In the event that the original card holder did not receive the referral card from another customer, the referrer ID 1107 can be the same as the referred ID 1109. In one embodiment, the referral cards 1105 distributed by the referring customer has the referral ID 1107 of the referring customer, but the referred ID 109 is blank and is waiting to be filled in by the referral acceptor 110.

Moreover, the referral system 1100 offers approaches for all types of businesses and can be used in a variety of ways, depending upon the particular needs of a specific business. Everything from high end restaurants to retail business with smaller priced items can experience unprecedented results using the referral card system 1100. While both types of businesses can use this program in a similar fashion, a restaurant promotion will be used to explain program specifics.

Generally, an objective of the referral system 1100 is to increase the amount of customers, purchases, and profits for businesses incorporating this program. With that in mind, customers of a business are given the opportunity to become a participant in the program while making purchases. In the restaurant business, while being presented with the bill for their meal, customers are offered the opportunity to earn a percentage of their bill as credit toward their next meal by establishing the referral card 105 account, with the specific percentage being established by that business owner.

For example, a bill of $100 and a credit of 10% would establish a $10 balance on an account toward future purchases, thus substantially increasing the opportunity for repeat purchases and increased company loyalty when employing the referral system 1100. Those customers who accept the offer and provide basic information such as their name, address, cellular phone number, and email address receive their own customized referral card 1005 along with, for example, an additional five (5) referral cards 1105 also containing the referring customers account information and referrer ID 1107, to be given to friends, family members, co-workers, and acquaintances they feel would frequent the business establishment. These referral cards 105 would then, if used by the referred customers, generate a benefit for the referring customer.

In one embodiment, in the referral system 1100, in addition to receiving credit for their own purchases, referral card 1005 referrers will also be credited a percentage of the purchases made by those using the referral cards 1105 they distributed. For example, if each of the individuals who were given referral cards 1105 with the referrer ID 1107 also made $100 purchases, and the referrer used the referral card1 1105 to receive a 10% on those purchases as well as a purchaser, they would establish $10 credit from their own original purchase, plus $50 credit from their referrals, totaling $60 in credit toward their next purchase. The business benefits from receiving patronage from the five referred customers they otherwise might never have received, as well as the repeat purchases of the original referral card 1005 holder.

Moreover, each person referred to a business will also have the opportunity to join the referral system 1100 by providing basic information such as their name, address, cellular phone number, and email address. Their own referral card 1005 will then be programmed and customized to contain their account information and they will receive an additional five (5) referral cards 105 containing their account information, to be given to their friends, family members, co-workers, and acquaintances they feel would frequent the business establishment.

In one aspect of the referral system 1100, an amount of credit a customer can redeem at any one time can be controlled by the business owner as a result of customizing the parameters established within the program. Therefore, a business can limit the amount of credit used toward purchases to 50% for example, so the original (referring) referral card 1005 holder with $60 credit, who purchases another $100, can only use $50 credit toward their purchase. This means the customer will either make larger purchases and spend more money than normal in order to use the excess credit, which posts more credit on their account as a result of that purchase, or they leave an outstanding balance of credit on the account in addition to the credit accrued as a result of current purchase; either way continually motivating customers to return in a never-ending and ongoing effort to use the credit they continue to build, as they earn credit from the 50% they paid in cash out-of-pocket, ensuring the card never has a zero balance and always retains value.

Moreover, in the referral system 1100, businesses with higher average purchases, in addition to benefitting from the referral system 1100 in a similar manner, which are faced with customers who hesitate to make purchases because the price of the products they sell can promote the referral system 1100 as an additional way to achieve even greater results. In one embodiment, the referral system 1100 offers solutions for businesses that motivate shoppers to make purchases immediately, while also motivating them to refer other customers to that business.

In many instances, regardless of all other factors, there are five (5) factors that determine the success and profitability of every business, and may be exploited by the referral system 1100:

1) The amount or percentage of profit made on the products being sold;
2) The number of shoppers entering the business;
3) The percentage of those shoppers that become customers by purchasing products;
4) The number of times a customer returns to make additional purchases; and
5) The amount of the average sale.

The first factor, the percentage of profit, is the only pre-established and constant factor, with the number of shoppers, the percentage of shoppers that become buyers, the number of times customers return to make repeat purchases, and the amount of the average sale, emerging as the fundamental factors that are controllable. While four of the factors are indeed variable, the combination of these variable factors dictates the profitability, and ultimately, the success or failure of every business. For example, a business with no profit, but plenty of customers, will not succeed, while a business with tremendous profits, loads of shoppers, but no buyers will also fail.

Generally, the referral system 1100 provides a multi-faceted referral approach that offers businesses the opportunity to increase the number of shoppers, increase the number of shoppers converted to paying customers, increase the number of times customers return to make repetitive purchases, as well as increasing the average amount of those purchases. Beginning with the first variable factor, the referral system 100 increases the number of shoppers by offering referring customers the financial incentive to profit from the promotion of that businesses to their friends, family members, co-workers, and acquaintances, drawing new customers to that business. The business also benefits from the encouragement, support, and positive influence the referring customers have on the new customers they bring to the business.

The referral system 1100 can also be a very effective way to increase the second variable factor, the number of shoppers converted to customers, by encouraging immediate purchases by providing a financial incentive to do so. The referral system 100 not only offers the opportunity for sales people to engage in conversation and influence purchases with potential customers after the customer rejects their assistance with the proverbial, "No thanks I am just looking," the program also provides an opportunity that motivates hesitant customers to overcome their hesitancy and make the purchases they would like to make, rather than opting not to when the time arrives to make the purchase.

The referral system 1100 also increases the fourth variable factor, the number of times a customer returns to make additional purchases. This is accomplished by the very fact that customers who refer others to a business gain both personal and financial benefits from their participation and interaction with the business. The benefits they gain, while in the form of in-store credit, discounts, or cash rewards, establishes a personal relationship between the customer and participating business, as well as demands the customer returns to that business in order to redeem their in-store credit, discounts, or to collect their commissioned earnings, which by its very nature increases repeat purchases by those customers. Additionally, the odds of customers redeeming the exact value of their credit is preposterously low, leaving the only alternatives of either paying additional cash to complete their purchases, or leaving unredeemed store credit on the books. Both outcomes translate directly to increased profits for the business. Another contributing factor offering even greater profitability for business owners, is that many of the customers who become excited about the opportunity to establish referral account credit with the referral system 1100 and refer customers, will never redeem their account balance, resulting in 100% profit to the business.

The fifth variable factor, the average sale amount, is certainly increased as a result of the referral system 1100, as the program offers shoppers the opportunity to profit from making their purchases through their promotion of the products marketed by businesses to their friends, family, co-workers, and acquaintances. Therefore, new customers often see the purchases they want to make as an opportunity to profit from future referrals, rather than seeing it solely as an expense. This can free their mind from the concerns of spending money and allows them to focus on the enjoyment of making the purchases they desire, as the referral system 1100 offers the opportunity to profit as a result of being a customer of establishments that offer this program. The referral system 100 gives businesses the ability to remove the anxiety many shoppers experience during the process of spending money, and replace that anxiety with feelings of pleasure and the perception of generating profits as a result of the experience.

The following is an example of how the referral system 1100 can boosts profits and close sales: anyone who has ever been approached by a sales person in a retail business has, on more than one occasion, been asked, "May I help you?" When asked this question we have all rejected their assistance at one time or another by responding, "No thanks, I am just looking!" This response is so automatic, many times customers blurt it out despite knowing exactly what they are looking to buy, or needing assistance locating the products they desire.

The situation can change drastically when a sales person who has the referral system 100 available receives the same response. Now, rather than disconnecting with the customer when they are told, "No thanks, I am just looking" as in the past, the sales person has the opportunity to persuade the shopper away from the automatic response into further interaction by the mere act of showing the customer the Referral Card and Sleeve (discussed in the "GIFT CARD ENVELOPE SIMULATING APPEARANCE OF CURRENCY AND GIFT CARD REWARD SYSTEM" Application, as incorporated) while describing the referral system 1100. Once the customer interaction is re-established, the sales person has the opportunity to provide further assistance, offer advice, and make sales, or discover why the shopper may be hesitant to make the purchase and use the benefits of the referral system 1100 to influence the sale.

The referral system 1100 gives business the ability to easily convert many shoppers to buyers simply by having the program available. Merely showing the Referral Card and Sleeve while explaining the program to customers after being told, "I am just looking" offers the sales person the opportunity to re-engage potential customers in conversation, thereby increasing sales and profits simply by creating the opportunity for sales people to continue interacting with shoppers, rather than bidding them farewell.

Customers who take the time to visit businesses usually intend to buy items of interest, yet many often hesitate when the time arrives to execute those purchases. These customers often identify themselves to sales people, provided interaction between the two parties continued past the automated responses rejecting assistance, by saying things like; "It is a little more expensive than I thought," "Thanks, but I really need to shop around," or the dreaded "I need to think it over." Like the "No Thanks, I am just looking" response, these replies also leave the majority of sales persons disarmed and defenseless, only with the additional feeling that any attempts to pressure the customer into making a purchase at that moment will reduce any chance of the customer returning later when they do decide to buy, normally prompting the automatic reply, "Ok, thanks for stopping by." As any seasoned sales professional or business owner knows, customers that actually return after claiming they need to contemplate a purchase are virtually non-existent.

When a sales person is told by a shopper, "It is a little more expensive than I thought," the referral system 1100 offers them the opportunity to persuade the shopper to make the purchase, rather than delaying it until a later time. In the case of receiving the response, "It's a little more expensive than I thought," the sales person can now ask the question, "How much more?" Regardless of the answer given by the shopper, that answer will lead directly into the introduction of the referral system 1100. If the sales person receives the response, "Thanks, but I really need to shop around," the sales person can respond by asking, "Is it the quality of the product, the warranty of the product, or the price of the product, that has you most concerned?"

Many times customers admit price is their greatest concern, which also leads directly into the introduction of the referral system 1100, as it introduces rewards for referrals. And, if the sales person receives the response, "I need to think it over," they can ask the similar question, "Is it the quality of the product, the warranty of the product, or the price of the product that you need to think about most?" Again, most customers respond by admitting price is their greatest concern, which again leads directly into the introduction of the referral system 1100.

Employment of the referral system 1100, in addition to providing the opportunity to increase sales and profits, also offers businesses a highly sophisticated data management and customer tracking system such as installed on a platform in the referral coordinator 1120.

Generally, until the advent of the referral system 1100, a vast majority of businesses in America were simply unable to afford the expenses involved in developing programs designed to track their customers purchases and buying habits, examine and summarize the effectiveness of advertising and promotional programs, and manage customer and employee incentive programs. Yet all these features are provided to businesses that integrate the referral system 1100 and in further embodiments provide merchant services in conjunction with use of referral coordinator 1120.

Generally, the referral system 1100 incorporates Referral Cards that are similar to gift cards and credit cards, which fit nicely into the custom designed Referral Card Sleeves 1106. These referral cards 1105 and Sleeves can be custom designed for any business, and the system operates through the software program disclosed in U.S. patent application Ser. No. 12/842,143, which is downloaded and installed onto credit card processing terminals. When a shopper mentions any of the expressions previously mentioned, use of the referral system 1100 is explained to them as the solution to their hesitancy, which can allow them to make their purchases without regret.

Hesitant customers are given the opportunity to participate in the program and should they accept, they are given the referral card 1005, which contains a specific number assigned to their account, such as the referrer ID 1107. The card 1005 is then inserted into the Perpetual Referral Card Sleeve 1106, which contains specific company information and program parameters. From that point forward, whenever that account number is registered, they will receive credit for purchases made by customers they are responsible for sending to that business. Exact implementation of the referral system 1100 and specific features, such as the percentage credited to the account holders from referred customer purchases, how the credit is redeemed by the account holder, credit expiration dates, and limits on the percentage of in-store credit that can be applied to a purchase, are decided by the business owners themselves, easily customized, and placed directly on the Referral Card Sleeves simply by filling in the blanks with the appropriate information.

For example, a percentage of commissions or in-store credit for referred customer purchases can be set by the business owner to any specific percentage, such as 3%, 5%, 10%, or more. The percentage can also be set to vary depending upon the total sale amounts referred, the total combined sale amounts referred during a specific time period, they can be set to reduce over a certain period of time as an incentive to act quickly, or even adjusted based on specific product categories. The amount of credit accrued by referring customers can be redeemed in the form of cash commissions, in-store credit, or a combination of cash and/or in-store credit can be offered depending upon the amount earned over a certain period of time, both to be decided by the owner of the business and printed on the Card Sleeves. The referral system 1100 offers tremendous flexibility and practically unlimited levels of customization, making it impossible to describe the almost endless number of combinations available to meet the specific needs of virtually any business.

Accordingly, businesses that incorporate the referral system 1100 are able to persuade shoppers to become buyers by allowing them to earn cash or in-store credit, based upon the purchases made by customers they refer to that business. Using the in-store credit concept, if a customer was shopping for clothing, but was hesitant to make a purchase, perhaps because they felt the products they liked were too expensive or more than they could afford, the sales person could explain how the customer could reduce the cost of those products by referring other customers who also make purchases at that business location. Using the cash back method, it is even easier to stimulate instant purchases, as the sales person can explain to the customer how they can make the purchase now, and perhaps earn even more then they are spending in cash or in-store credit through future referrals.

The referral system 1100 can be set up to use one referral card 1005 per account, or each participant can be given a certain number of referral cards, say 5 or 10 cards containing the same account number, depending upon the amount of their initial purchases. They can then distribute those referral cards 1105 and Sleeves to friends, family members, co-workers, and acquaintances, predicated upon who they feel are most interested in the products sold by that business. The referred customers would then bring the referral card 1005 back to the business and swipe them when making their purchases, making it easy for businesses to keep track of the proper amount of accrued credit and account information. In addition, the new customer's personal information and personal account number can then be programmed onto the referral card 1005, allowing them to accrue cash incentives or in-store credit for future purchases from customers they refer to the business.

The referral system 1100 offers even more opportunities to increase sales and profits by further enhancing the motivation for customers to make immediate purchases by providing the additional incentive of offering hesitant customers the opportunity to start the program with commissions from their own initial purchase being credited to their account, provided they make that purchase there and then. Customers who are not motivated to make purchases immediately after having the referral system 100 explained to them may be persuaded by offering the additional incentive of them beginning their referral account by earning commission credit on the purchase they are about to make, as well as customers they refer to the business.

In a further aspect of the referral system 1100, if, in the event customers are still not persuaded to make their purchase immediately by participation in the referral system 1100, or by receiving commission credit for their immediate purchase, the potential profits from both the customer's purchase and the purchases of the referrals they send can still be earned by the business as the result of opening a referral account for the future customer, without their making a purchase. This encourages them to send friends, family members, co-workers, and acquaintances to make purchases as they accrue commission credit towards the future purchase of the products they desire. The referral system 100 is not only designed to turn hesitant shoppers into buyers and buyers into passionate, self-motivated advertisers and business promoters who inspire new customers to make purchases from specific businesses, it also provides an incentive for virtually every customer of any business to encourage their friends, family members, co-workers, and acquaintances to become patrons of that business as well.

In a further embodiment, businesses can expand upon the program by creating contests or special events that offer cash rewards, products, prizes, or additional store credit for participants in the referral system 1100 who refer the most customers, are responsible for the highest amount of sales, the highest total sale, etc. during designated periods of time.

Moreover, while any business owner should recognize that customer loyalty will certainly increase exponentially as a result of their customer's participation in the referral system 1100, their customers will also be establishing a personal relationship with their business while establishing store credit. The value of this customer loyalty can be further enhanced and assured when businesses located in the same geographical area network together to allow their customer to generate credit for their loyalty and referrals to businesses that are part of the closed network.

As an example, if one were a customer of a certain sporting goods store that opened a referral account for the holder of the referral card 1005, and understood that the customer could generate more store credit by dining in a particular restaurant and referring friends, family members, co-workers, and acquaintances to do the same, the customer's loyalty to that restaurant would be instantaneous as the loyalty contributed to the customer's personal benefit. As the marketing of the referral system 1100, grows nationally, the referral system 1100 member businesses, such as a local system, will be presented with a variety of opportunities to use this program to further increase customer traffic, sales, loyalty, and profits.

In various embodiments, there can be, for example, six different plans available to businesses within the referral system 1100. From the basic plan to the premium plus and exclusive design plans, each progressive program offers additional flexibility, features, benefits and incentives that make the program more adaptable, customizable, effective, and profitable. Each of these plans can be calculated by the referral calculator 130. These plans are:

Basic plan: offers generic referral cards 1105, sleeves, and choice of 3%, 5%, or 10% commission with a basic software accounting system, such as employed by the referral coordinator 1120, to track account totals and tabulate commissions earned by customers as a result of referred sales.

Custom plan: The custom plan offers customized cards and sleeves with a customizable software management system that tracks customer referral accounts, allows business to select and/or change referring customer rebate levels for their personal purchases, as well as the commission levels earned on the purchases made by customers they refer to that business, and tabulates the commissions and rebates. This plan can also incorporate alternative reward programs for additional customer promotions.

Custom Plus plan: In addition to the features available in the Custom plan, the Custom Plus plan offers the "customer challenge program," which establishes total commission amounts to be achieved by customers by a certain date, in order to receive their referral commissions in cash. Should they fail to achieve the agreed to level of referral commissions by the established date, the customers receive their referral commissions as in-store credit only. The Custom Plus plan includes a custom accounting program for complete system management and analysis.

Premium plan: The Premium Plan, in addition to offering the features and benefits available in the Custom plus Plan, offers the exclusive "employee challenge program" that registers and tracks the employees who are responsible for effectively implementing the Perpetual Referral Card Program, registering referral card 1005 holders, and establishing successful referral accounts. This gives businesses the ability to track the program results by monitoring accounts associated with each employee, offering the opportunity to reward employees for their successful implementation of the referral card 1005 program and contributing to the increased sales and profitability of the business. The premium program includes an advanced software accounting program for complete system management and analysis.

Premium Plus plan: The Premium Plus plan offers all the features and benefits of the Premium Plan with the additional advantages of complete system analysis, customer tracking and account management, including access to an Internet-based customer communication and management system, and the exclusive "customer challenge enhancement," which links each generation of referred customers to the next. This "customer challenge enhancement" offers the opportunity to further improve the referral card 1005 by offering increased earnings to both employees and referring customers, based on the referrals that are referred by the referrals the original customer personally referred. To clarify, while a customer might earn a 5% commission on customers they directly refer to a specific business, this option provides the ability to offer commissions on additional levels of referrals.

For example, referring customers could receive a 3% commission on purchases made by referrals of the customers they were personally responsible for referring, with an additional 1% on the third generation of referrals. This feature can be customized by the business for up to 5 generations of referrals for each customer. This feature immediately multiplies the opportunity for customers to benefit from the Perpetual Referral Card Program, which dramatically increases their motivation to drive referrals to the business. This enhancement exponentially increases the incentives for referring customers to increase their earnings, by promoting the business to their friends, family members, co-workers, and acquaintances, realizing they also benefit from the referrals their referrals make as well, and also exponentially increases the motivation of the employees of that business to increase their earnings by promoting the benefits of the Perpetual Referral Card program, increasing the sales and profits of the business, and benefiting personally through an employee commission or rewards program.

Exclusive Custom Design Plans: a marketing company employing the invention, offers selected clients the opportunity to work directly with our marketing strategists to customize this program specifically for their particular business needs. In addition, software developers, graphic designers, and marketing strategists are available to work directly with business owners in developing custom referral, loyalty, promotional, and personal rewards programs exclusively designed for their company.

The referral system 100 can be effective with a broad swath, perhaps all, businesses, from one as simple as a pizzeria, where customers receive credit for their own purchases, as well as the purchases of others, allowing them to frequent the restaurant more often as a result of business they generated for the restaurant; to automobile dealerships where someone needing repairs or shopping for a new or used car could influence friends, family members, co-workers, and acquaintances they know who are interested in purchasing a new or used vehicle, simply for the credit they can earn towards the purchases they desire. This could be especially effective when offered to a new car buyer, who will be proud to show their new vehicle to friends, family members, co-workers, and acquaintances, and who can then earn credits toward accessories, attire, or future maintenance, by influencing others to make similar purchases.

In one embodiment, a training provider, such as a marketing company employing the invention, will provide all member businesses with video presentations promoting the Perpetual Referral Program. These presentations are designed to be shown to potential customers and accordingly will be tailored to the plan chosen by the business so as not to explain aspects of the more advanced plans to customers of basic plan programs. The video presentations can be viewed over the internet or downloaded by the company to be shown through a variety of sources. A purpose of the customer video is to explain the program in detail while motivating them to make their purchase and register to be part of the program.

In a further embodiment, the training provider, a marketing company employing the invention, will also provide all member businesses with video presentations promoting the referral system 1100 to employees. These presentations explain the program to employees while explaining how to market the referral system 100 and accordingly will also be tailored to the plan chosen by the business. The purpose of the employee video is to explain the program in detail while motivating them to use the product and register as many customers as they can with the program. In a still further embodiment, businesses selecting the premium plan with "employee challenge program" or the premium plus plan with the addition of the "customer challenge enhancement" will receive video presentations which describe the benefits employees receive as a result of promoting the program.

As discussed above, the referral system 1100, such as employed by the referral system 1100, employs a marketing campaign that is capable of producing unprecedented results. In a further embodiment, referral system 1100 may be combined with a gift card system such as in the gift card, sleeve and system disclosed in U.S. patent application Ser. No. 12/842,143, and incorporate issuing referral card 1005 applicants a certain number of Gift Cards. In one embodiment, these active Gift Cards would be registered to the Referral Card holder, contain an undisclosed value, for example up to $100, which the referral card holder would then distribute to friends, family members, co-workers, and acquaintances they feel would be interested and qualified to make purchases from the particular business and would appreciate receiving Gift Cards containing an undisclosed value that would be revealed and redeemed when making purchases at the issuing business establishment.

Purchases made by referred customers redeeming the active Gift Cards would then be credited to the account of the referral card 1005 holder. The customers redeeming the gift cards would be enrolled in the referral system 1100 and would themselves also receive a certain number of referral cards 1105. These referral cards 1105 would be registered to the referral card 1005 holder, contain an undisclosed value, for example, up to $100, which the referral card 1005 holder would then distribute to friends, family members, co-workers, and acquaintances they feel would be interested and qualified to make purchases from the particular business and would appreciate receiving Gift Cards containing an undisclosed value that would be revealed and redeemed when making purchases at the issuing business establishment.

This cycle would continue as long as referral card 1005 holders continue to distribute referral cards 1105, also functional as a gift card, to their friends, family members, co-workers, and acquaintances who become customers; who in turn redeem them while making purchases which pay the original referral card 1005 holder a percentage of the sales, and the customers redeeming the referral cards 1105 are converted to Referral Card 1005 holders with their own referrer ID 1107 who then distribute Active Gift Cards attached to their account to other friends, family members, co-workers, and acquaintances who in turn do the same.

The referral system 1100 offers financial incentives to make desired purchases based on the number of purchasing customers they send to a specific business to customers. The gift cards embodied in the referral cards 1105 simultaneously gives potential customers the incentive to patronize that business establishment and make purchases, in order to redeem the value of the Active Gift Card, and who then register to earn income and/or credit for referring others who also make purchases in order to redeem the value of their Active Gift Cards as well.

Figure 12:
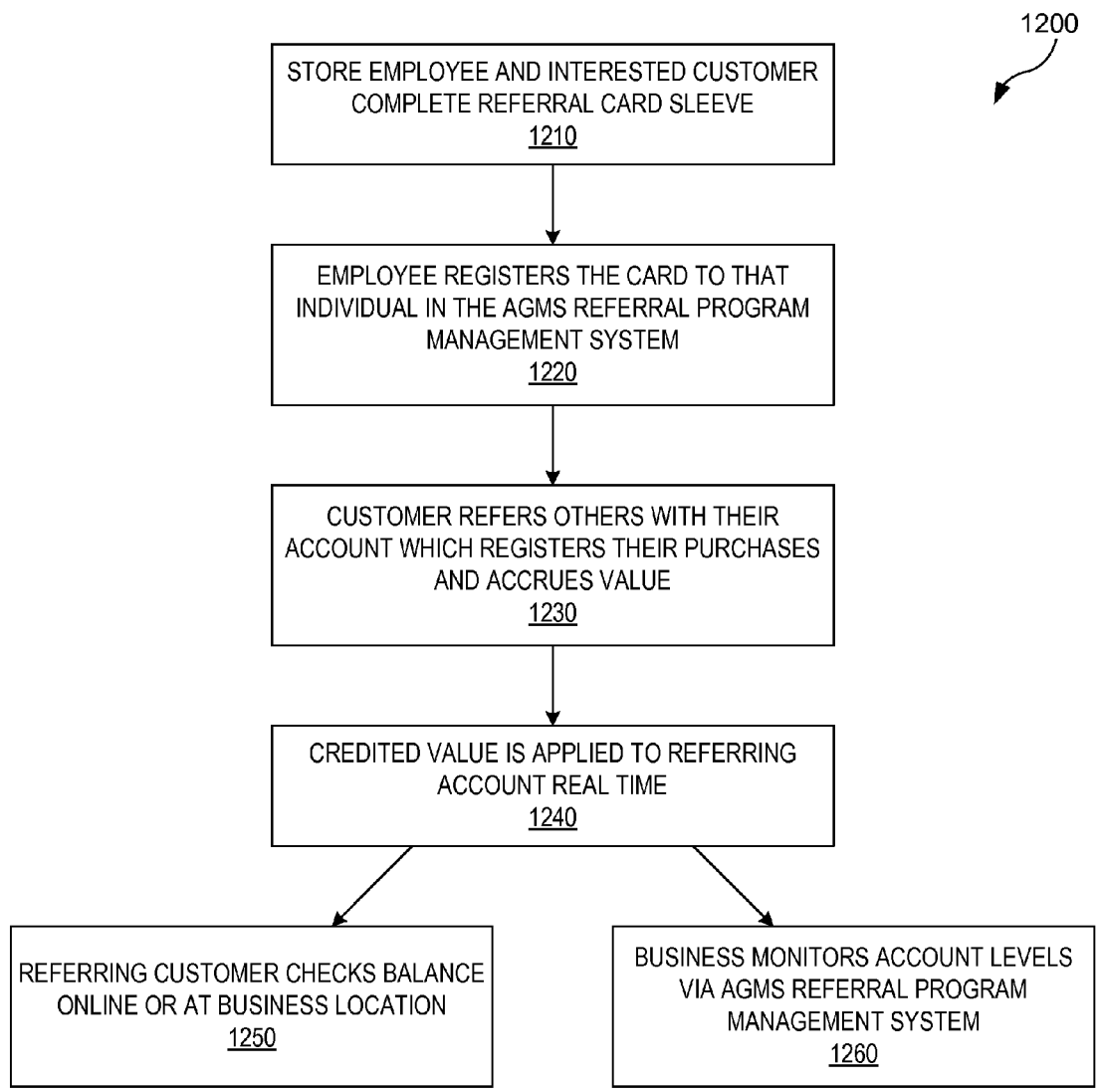
FIG. 12 is a simplified flow chart of a store employee and a customer completing a referral card.

Turning now to FIG. 12, illustrated is a simplified flow chart 1200 of a store employee and a customer completing a referral card.

In a step 1210, a store employee and an interested customer complete the referral card 1005, and this completion can occur in the referral acceptor 1110. In one embodiment, this can be a referral card sleeve.

In a step 1220, an employee registers the referral card 1005 to that interested customer in the referral acceptor 1110. The interested customer is then a "holder" of the account. The referrer ID 1107 then refers to the interested customer.

In a step 1230, the customer refers others with the customer's account, referrer ID 1107, which registers the others purchasers and then accrues value for the referrer. For example, if two additional customers used the referral cards 1105 conveyed by the interested customer of 1220 to buy items, the interested customer's account accrues value, as indexed by the referrer ID 1107, and calculated in the referral calculator 1130.

In a step 1240, the credited value of the additional customers is credited to the referring account in real time, as calculated in the referral calculator 1130.

Then, in a step 1250, the referring customer checks the balance of the account online or at a business location, such as at the I/O 1140. Alternatively, in a step 1260, the business monitors the account level via the referral system 1100, such as at I/O 1140. In a further embodiment, both step 1250 and step 1260 are employed.

Figure 13:
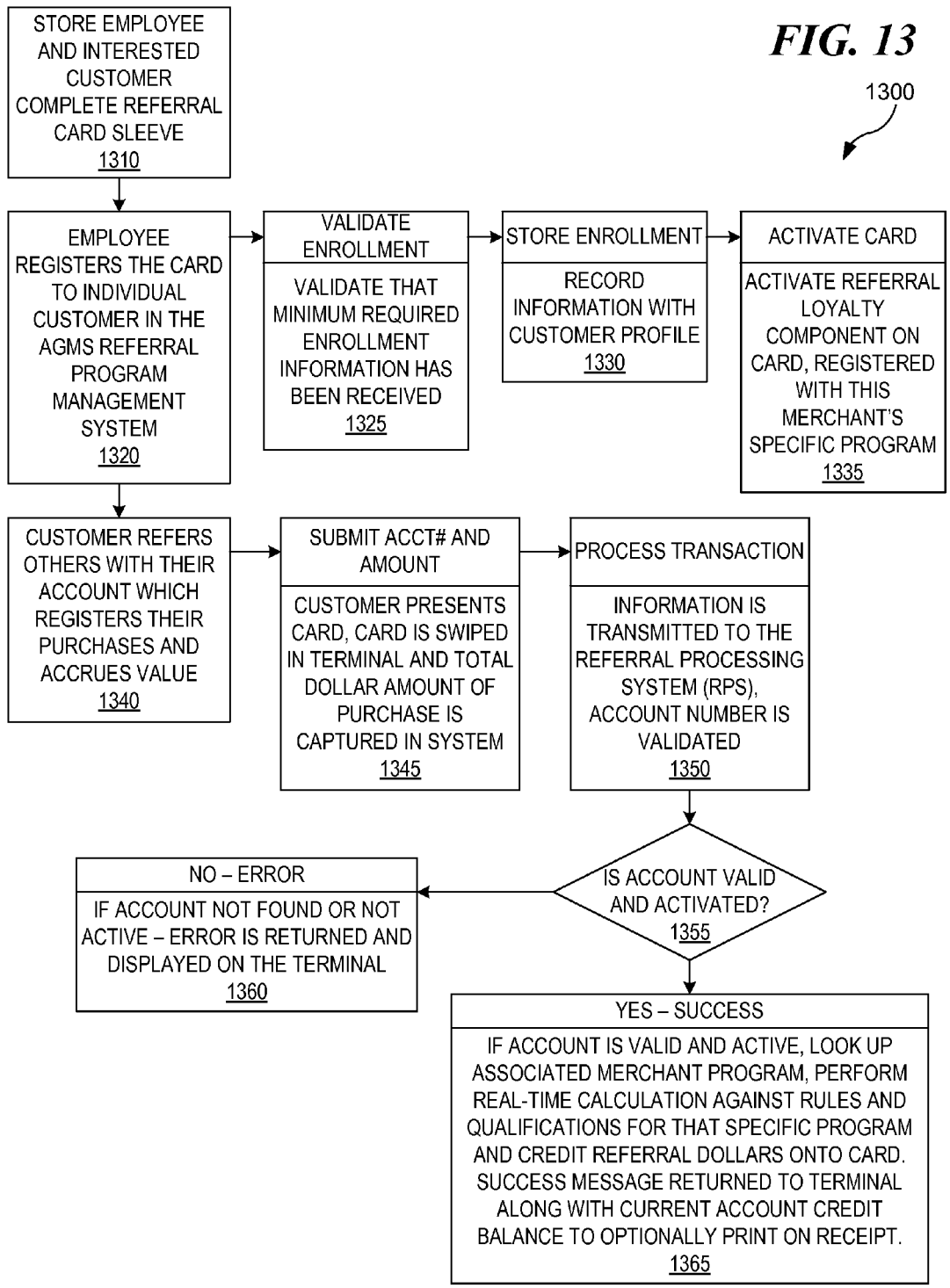
FIG. 13 is a simplified flow chart representing a store employee and a customer completing a referral card in more detail.

Turning now to FIG. 13, illustrated is a simplified flow chart 1300 representing a store employee and a customer completing the referral card 1005 in more detail.

In a step 1310, a store employee and an interested customer complete a referral card, and also a referral card sleeve. In a step 1320, the employee registers the card to the individual customer in the referral system 1100 in the referral coordinator 1120.

In a step 1325, the enrollment information is validated by the referral coordinator 1120. It is determined whether a minimum of enrollment information has been received.

In a step 1330, the information is recorded in a customer profile in the referral coordinator 1120. In a step 1335, a referral loyalty component on the card is registered with a merchant's specific indicia.

In a step 1340, the referring customer refers others with the referring customer's account number or a number otherwise associated with the referral card 1005. In a step 1345, a referred customer presents a referral card 1005 received from the referrer, the referral card 1005 is swiped in a terminal, and the total amount of purchase is stored in the referral system 1100.

In a step 1350, information is transmitted to a referral processing system of the referral coordinator 1120 and the account number associated with the referred ID 1107 is attempted to be validated. In a step 1355, it is determined whether a referring account is valid and activated. In a step 1355, if the referring account is valid and active, a step 1360, a look-up associated merchant program is activated; if not valid and activated, a step 1365 is activated.

In the step 1360, if the referenced referring account as indexed by referred ID 1107 is valid and active, a real-time calculation is performed for that specific merchant and credit referral dollars onto the referring card 1005. In a further embodiment, a success message is returned to a terminal of the I/O 1140, along with a current credit account balance to print on a receipt. However, in a step 1365, if the referring account is not found or not active, an error message is returned and displayed on the terminal of the I/O 1140.

Figure 14:
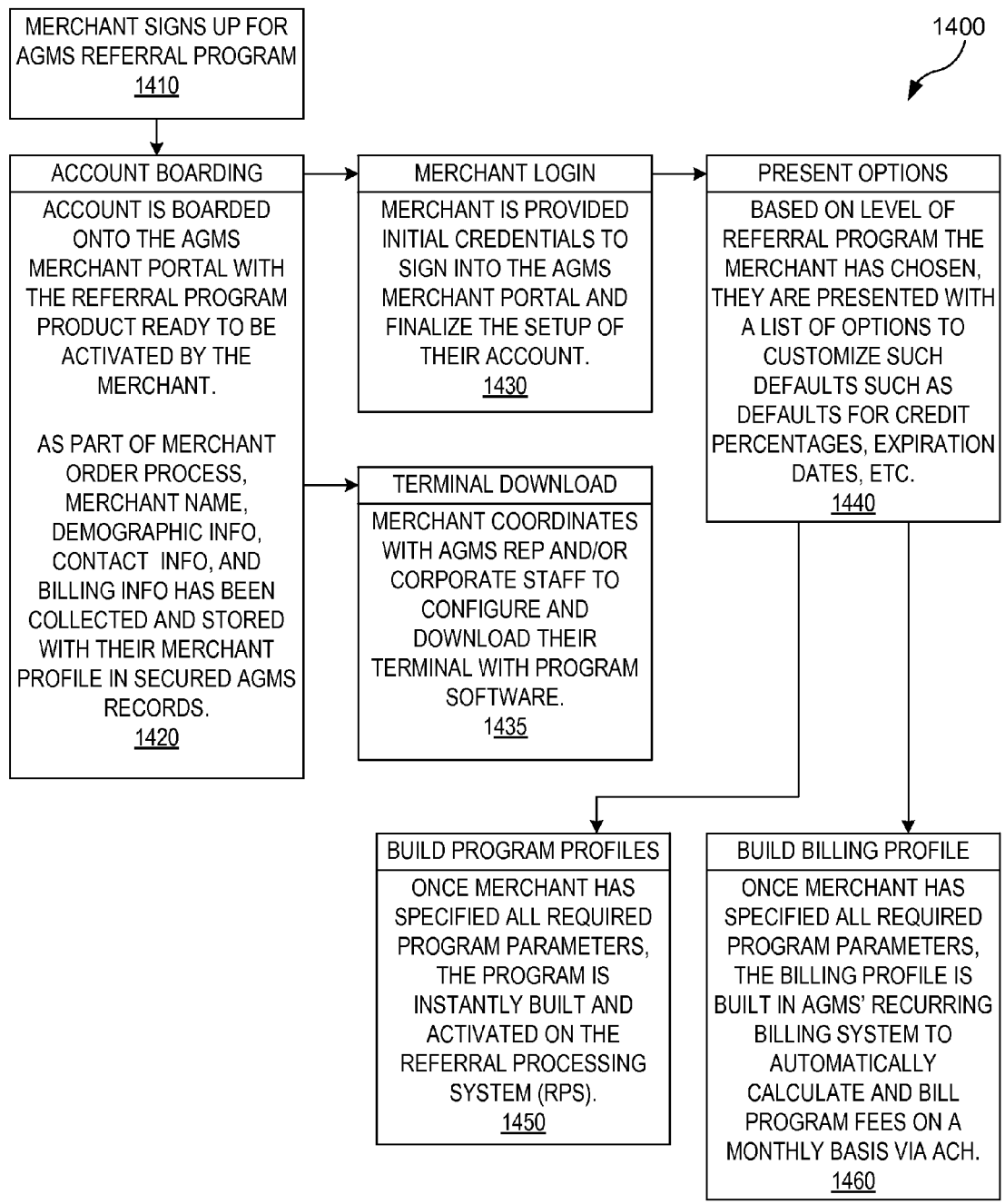
FIG. 14 is a simplified flow chart representing a merchant set up of a referral system in more detail.

Turning now to FIG. 14, illustrated is a simplified flow chart 1400 representing a merchant set up of a referral system in more detail. In a step 1410, a merchant enrolls in the referral system 1100 at the referral accept 1110. In a step 1420, the account is boarded onto a merchant portal with a referral program product, ready to be activated by the merchant. Then, a step 1430 and a step 1440 are processed substantially in parallel.

In a step 1430, a merchant login is performed. The merchant is provided initial credentials to sign into the merchant portal and finalize a setup of their account. In a step 1435, the merchant coordinates with various agents of the referral system 1100 to configure the merchant's terminal with downloadable software. The step 1440 presents the merchant with a list of options to customizes their downloadable software, such as defaults for credit percentage, expiration dates, etc., based on a level of a referral of the referral system 100 the merchant has chosen.

In a step 1450, a program profile for the merchant is built. Once the merchant has specified all required program parameters, the program is built, in some embodiments substantially instantaneously, and the program is activated in the referral system 1100. In a step 1460, a billing profile is built. In the step 1460, once the merchant has specified all the required program parameters in step 1440, the billing profile is built in the referring system 1100 to automatically calculate and bill program fees on a monthly basis, such as through automated clearing house ("ACH") payments.

Figure 15:
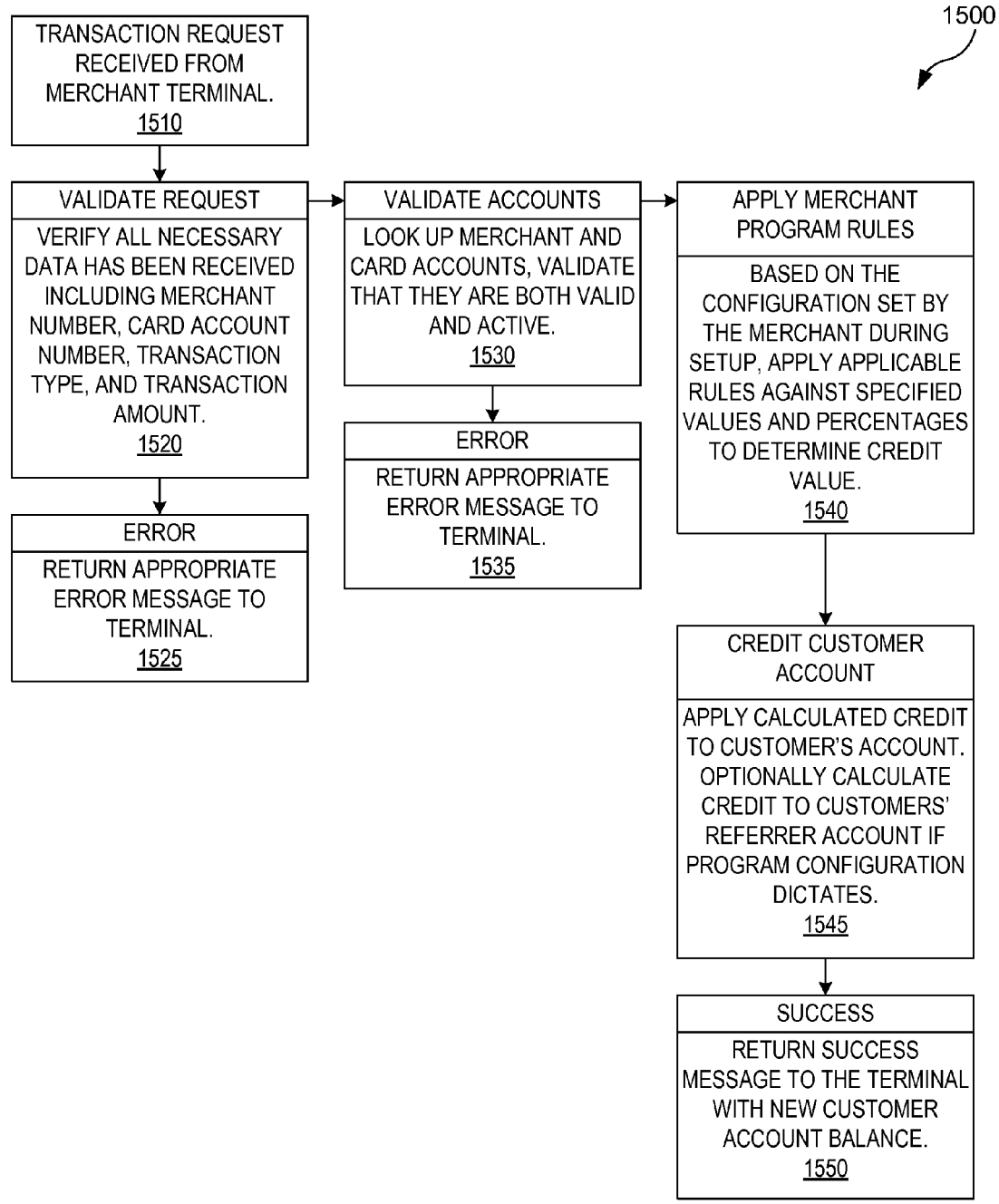
FIG. 15 is a simplified flow chart representing a processing of a referral request.

Turning now to FIG. 15, illustrated is a simplified flow chart 1500 representing a processing of a referral request. In a step 1510, a transaction request that uses the referral card 1005 from a referred customer is received at a terminal. In a step 1520, the request is validated by the referral coordinator 1120. It is verified that all necessary data has been received by referral system 1100 including a merchant number, a transaction type, and a transaction account. If there is not a verification in the step 1520, in a step 1525, an appropriate error message is conveyed to the terminal.

If validated, in a step 1530, the referral system looks up the merchant card accounts to validate that they are both valid and active. If there is not a verification in the step 1520, in a step 1535, an appropriate error message is conveyed to the terminal.

In a step 1540, based on the configuration set by the merchant during the setup during method 1400, the referral system 1100 applies applicable rules against specified values and percentages to determine credit values. In a step 1545, the calculated credit is applied to the referred customer's account. In a further embodiment, a credit is calculated to the customer's referrer account, as indexed by the referrer ID 1107, if the program configuration dictates. In a step 1550, a return success message is returned with the customer account balance.

It should be noted that, although cards 5, 305 and 1005, and envelopes 100, 300 and 1006 are shown as physical objects, in some embodiments, the cards 5, 305 and 1005, and envelopes 100, 300 and 1006, could be replaced by electronic displays of electronically stored information in applications for computerized devices such as "smart" cellular telephone, personal computers, laptop computers, data "pads," such as the "iPAD," and the like. In this case, in one embodiment, the agent or salesperson would have a computer application program on their computerized device, which could then download and transmit the required data and program information to the prospective customer or client, who would then have the necessary information and data associated with them, in the same manner as with the physical cards, sleeves and envelopes previously described. This embodiment is also advantageous in that, since the prospective customer's or client's electronic device generally has a unique identifier (such as a unique telephone number, email address, IP address or the like), maintaining account information is facilitated. Furthermore, the unique identifier of the prospective customer's or client's electronic device will also facilitate transmission of further marketing material to the prospective customer's or client's electronic device, and/or otherwise following up with or communicating with the prospective customer or client by means of their electronic device.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A system comprising:
    a referral card program comprising a referral card issued by an issuing entity on behalf of a merchant having machine-readable account information stored thereon identifying account information for at least said merchant, a first referring entity authorized by said issuing entity to initially distribute said card, a second referring entity authorized by said first referring entity to obtain valuable benefits from said issuing entity in a manner predetermined by the issuing entity in exchange for taking action predetermined by said issuing entity and/or to further distribute said card to at least one additional referring entity in exchange for other benefits, the card being configurable to contain an undisclosed value that can only be determined by a holder of the card at the time of a purchase at said merchant, the manner of payment of benefits by the issuing entity being determined such that the card never has a zero balance of available benefits;
    a referral acceptor;
    a referral coordinator coupled to the referral acceptor;
    a referral calculator coupled to the referral coordinator and
    an input/output (I/O) device coupled to the referral coordinator, wherein the referral acceptor is configured to accept said referral card, wherein the referral card has a referrer identifier that identifies each referrer of the holder of the referral card.

2. The system of claim 1, wherein said referral card also acts as a gift card for the holder of the referral card.

3. The system of claim 1, wherein said referral card further comprises a referred identifier.

4. The system of claim 3, wherein a benefit accrues upon a use of the referral card to a referrer identified by the referrer identifier.

5. The system of claim 1, wherein a plurality of referral cards share a same referrer identifier.

6. The system of claim 1, wherein a merchant programs the referral card at the referral acceptor.

7. The system of claim 1, wherein the referral card has an associated referral card sleeve, said sleeve having human-readable information printed thereon identifying the referring entities.

8. A method operable on a computer system for allocating benefits from referral and use of a referral card issued by an issuing entity on behalf of a merchant comprising:
    completing a referral card application having a referrer identifier by a referring person for said issuing entity, the referrer identifier being stored on the card in machine-readable form;
    registering the referral card application by storing account information for the referrer in a computer memory;
    referring, by the referrer, a referred customer to the merchant with the referral card by storing account information for the referring entity in a computer memory;
    registering the referral card of the customer in their own account which registers purchases and applies a gift card value associated with the referral card for that account by storing account information for the customer in a computer memory; and
    crediting value to the referrer's account by means of a computing device to allocate benefits provided by an issuing entity among the referrer and the customer in a manner predetermined by the issuing entity, the card being configurable to contain an undisclosed value that can only be determined by a holder of the card at the time of a purchase at said merchant, the manner of allocation of the benefits ensuring that the card never has a zero balance of available benefits.

9. The method of claim 8, wherein the crediting occurs in real time.

10. The method of claim 8, wherein a value is selected from one of the group consisting of:
    a basic plan:
    a custom plan:
    a custom plus plan:
    a premium plan:
    a premium plus plan: and
    a custom design plan.

11. The method of claim 8, wherein said referral card also acts as a gift card for a holder of the referral card.

12. The method of claim 8, wherein said referral card further comprises a referred identifier.

13. The method of claim 8, wherein a plurality of referral cards share a same referrer identifier.

14. A method, comprising:
    enrolling by a merchant in a referral card program, said referral card program comprising a referral card issued by an issuing entity on behalf of a merchant having machine-readable account information stored thereon identifying account information for at least said merchant, a first referring entity authorized by said issuing entity to initially distribute said card, a second referring entity authorized by said first referring entity to obtain valuable benefits from said issuing entity in a manner predetermined by the issuing entity in exchange for taking action predetermined by said issuing entity and/or to further distribute said card to at least one additional referring entity in exchange for other benefits, the card being configurable to prevent a holder of the card from determining the available balance until the time of a purchase at said merchant, the manner of payment of benefits by the issuing entity being determined such that the card never has a zero balance of available benefits;
    validating the information enrolled by the merchant;
    presenting a list of options to customize a referral card; and
    selecting by the merchant from the list of options for the referral card.

15. The method of claim 14, wherein the options include:
    defaults for credit percentage to be applied to a referrer; and
    an expiration date for a referral card.

16. The method of claim 14, further comprising activating the referral card.

17. The method of claim 14, further comprising inputting a referral identifier for a referral card holder.

18. The method of claim 14, further comprising inputting a gift card amount for the referral card.

19. The method of claim 14, further comprising activating a plurality of referral cards having a same referral identifier.

20. The method of claim 14, further comprising entering a merchant identifier into the referral card that identifies the merchant.

* * * * *